United States Patent
Zaidi et al.

(10) Patent No.: US 10,728,719 B1
(45) Date of Patent: Jul. 28, 2020

(54) TECHNIQUES FOR COMBINING SEGMENTED MESSAGES IN A COMMUNICATIONS NETWORK

(71) Applicant: Bandwidth, Inc., Raleigh, NC (US)

(72) Inventors: Syed Mohsin Reza Zaidi, Cary, NC (US); Bryan C. Turner, Durham, NC (US); Alan Woodrow Bevier, Raleigh, NC (US); Jeremy Howard, Apex, NC (US)

(73) Assignee: Bandwidth, Inc., Raleigh, NC (US)

( * ) Notice: Subject to any disclaimer, the term of this patent is extended or adjusted under 35 U.S.C. 154(b) by 0 days.

(21) Appl. No.: 16/854,954

(22) Filed: Apr. 22, 2020

(51) Int. Cl.
*H04W 4/14* (2009.01)
*H04W 4/20* (2018.01)
*H04L 29/08* (2006.01)

(52) U.S. Cl.
CPC ............... *H04W 4/14* (2013.01); *H04L 67/10* (2013.01); *H04W 4/20* (2013.01)

(58) Field of Classification Search
CPC ....... H04W 4/14; H04W 88/06; H04W 80/06; H04W 88/02; H04W 8/04; H04W 4/24; H04W 8/06; H04W 92/06; H04L 69/22; H04L 51/36; H04L 63/0428; H04L 51/32; H04L 69/08; H04L 51/06; H04L 65/1033; H04L 45/308; H04L 51/00
See application file for complete search history.

(56) References Cited

U.S. PATENT DOCUMENTS

| | | | | |
|---|---|---|---|---|
| 6,868,274 | B1* | 3/2005 | Ayabe | H04W 4/14 455/466 |
| 2011/0281594 | A1* | 11/2011 | Goldberg | H04L 51/38 455/466 |
| 2016/0037312 | A1* | 2/2016 | Chuang | H04L 51/063 455/466 |

* cited by examiner

*Primary Examiner* — Kwasi Karikari
(74) *Attorney, Agent, or Firm* — Gregory Stephens; Jonathon Lewis

(57) ABSTRACT

Techniques are disclosed for passing short message service (SMS) messages between sending and receiving SMS service providers over a network comprising a default data center and one or more alternative data centers. The default data center may receive message segments of an SMS message from the sending SMS provider into a local storage area of a concatenator comprising a local and a global storage area. The message segments may include segmentation information indicative of a number of message segments associated with the SMS message, routing information, the sending SMS provider, and the receiving SMS provider. When all the message segments have been received within a local timeout period, the default data center concatenates the message segments into a single SMS message and sends it to the receiving SMS service provider. When not all of the message segments have been received, the default data center moves the message segments to the global storage area sends the received message segments to an alternative data centers. The alternative data center receives all of the message segments from one or more data centers into its global storage area; concatenates them into a (Continued)

single SMS message; and sends the concatenated SMS message to the receiving SMS service provider. Other embodiments are disclosed.

21 Claims, 9 Drawing Sheets

US 10,728,719 B1

TECHNIQUES FOR COMBINING SEGMENTED MESSAGES IN A COMMUNICATIONS NETWORK

TECHNICAL FIELD

The present disclosure relates generally to messaging within a network. More specifically, but not by way of limitation, the present disclosure relates to providing segmented messaging in a communications network.

BACKGROUND

Client devices or end user devices utilizing wireless communication protocols are ubiquitous. Many of these devices utilize a circuit switched cellular network and/or an IP based cellular network (e.g., Global System for Mobile Communication (GSM), Code Division Multiple Access (CDMA), Long Term Evolution (LTE), 5G) to send and receive messages to other end user devices. These devices may be operable over a wired connection (e.g., coaxial, fiber optic, hybrid fiber coaxial (HFC), Ethernet), a wireless connection (e.g., IEEE 802.11, Infrared (IR), Bluetooth, WiMax), or one of the many cellular internet protocol (IP) data connections now available. Each of these end user devices may use a different access network but all are interfaced at some point to allow for various communications among the different networks.

SUMMARY

Various embodiments of the present disclosure provide segmented messaging in a communications network. One example computing device includes a non-transitory computer-readable medium; and one or more processors in communication with the non-transitory computer-readable medium, the one or more processors configured to execute instructions stored in the non-transitory computer-readable medium to: receive at least one message segment of a message from a first client device, the at least one message segment of the message comprising segmentation information that indicates a number of message segments associated with the message; determine the number of message segments associated with the message based on the segmentation information; based on a determination that the message comprises a plurality of message segments, determine whether the plurality of message segments was received by the computing device, wherein: based on a determination that the plurality of message segments was not received by the computing device, send the at least one message segment to a remote computing device; and based on a determination that the plurality of message segments was received by the computing device, combine the plurality of message segments into a concatenated message and send the concatenated message to a second client device.

One example method includes receiving, by one or more processors, at least one message segment of a message from a first client device, the at least one message segment of the message comprising segmentation information that indicates a number of message segments associated with the message; determining, by the one or more processors, the number of message segments associated with the message based on the segmentation information; based on a determination that the message comprises a plurality of message segments, determining, by the one or more processors, whether the plurality of message segments was received by the one or more processors, wherein: based on a determination that the plurality of message segments was not received by the one or more processors, sending the at least one message segment to a remote computing device; and based on a determination that the plurality of message segments was received by the one or more processors, combining, by the one or more processors, the plurality of message segments into a concatenated message and send the concatenated message to a second client device.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the examples, serve to explain the principles and implementations of the certain examples.

DETAILED DESCRIPTION OF THE EMBODIMENTS

Figure 1:
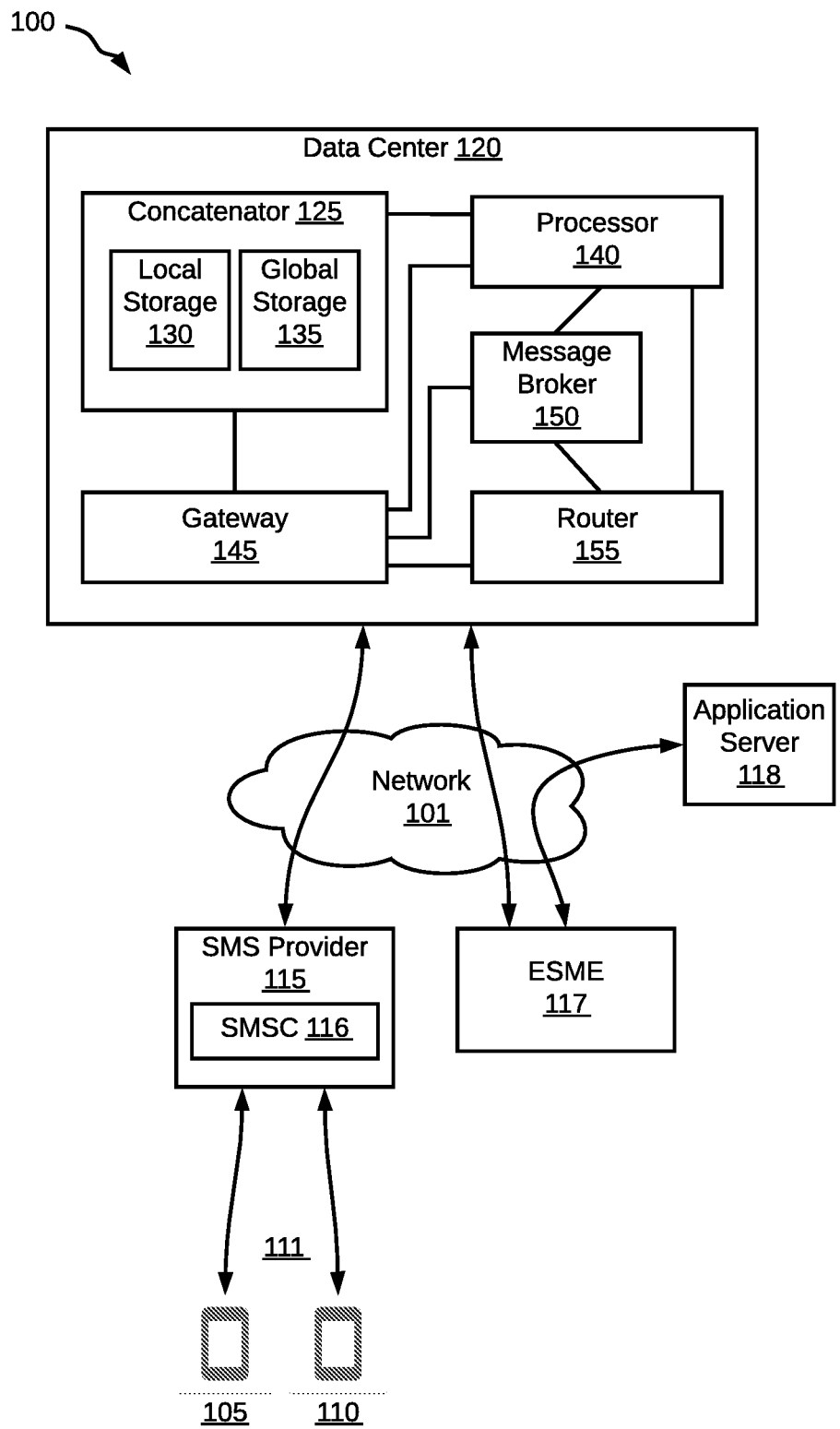
FIG. 1 shows an example of a system for segmented messaging in a communications network according to this disclosure.

Certain aspects and features of the present disclosure involve systems or methods capable of providing segmented messaging in a communications network with which a user may send or receive message. Some example systems can provide segmented messages, for example, by selectively routing messages between users. The description of illustrative examples are provided merely as examples, not to limit or define the limits of the present subject matter. Various examples are described herein and variations of such examples would be understood by one of skill in the art. Advantages offered by various examples may be further understood by examining this specification and/or by practicing one or more examples of the claimed subject matter.

Users frequently use their mobile devices to send text messages to each other (person-to-person or P2P) or exchange messages with server based applications (application-to-person or A2P). These can be short-message service ("SMS") or multimedia message service ("MMS") messages or other kinds of device-to-device messages, such as Apple's iMessage.™ Each of these different message formats (as well as any other suitable device-to-device messaging protocol) typically impose constraints on the length of individual messages that may be sent. For example, SMS messages are typically limited to 140-160 characters. But because user's text messages frequently exceed these limits, the messages may be broken up into multiple message segments that are each sent separately across a communications network before being recombined for delivery to the recipient's device.

In many cases, the user may not be aware of these limitations and text messaging applications on mobile devices may even hide these limitations from the user, or provide only subtle information about the message segments they will be sending. For example, a user interface of a text messaging application may show a character and message count (e.g., 2/225, where 225 is the character count and 2 is the number of message segments that will be sent to accommodate the message) in an unobtrusive part of the messaging user interface. However, to transfer and deliver these multi-segment messages to the recipient, the communications network may employ functionality that manages the separate routing of the discrete message segments through the network and ultimately reconstruction of the full message before it is delivered to the user.

To transfer the message segments through the network to a final network location before the reconstructed message is delivered to the user or application, the user device sends the multiple message segments to the network using one or more network connections, such as a cellular connection or a WiFi connection. While these message segments are all related to a single larger message, each message segment arrives in the network as a discrete message. Thus, when the network receives the message segments, it treats them as individual text messages and routes them through the network separately which means that different segments of the same message may be routed to different data centers. But to reconstruct and deliver the original message, each of the message segments must ultimately arrive at the same network component, where they can be reassembled into the complete message.

To accomplish this, a concatenation process may be employed such that when different network components, such as different data centers (DCs), receive one or more message segments of the same message, the message segments are concatenated using one or more concatenator components. The concatenation process stores received message segments in one or more local concatenator(s) and waits for additional message segments to arrive. If after a period of time, all of the message segments of a message arrive at the local concatenator(s), the message is reassembled and sent to the recipient device. However, the local storage within a data center concatenator may not receive all of the message segments because they have been routed separately within the network to different data centers. If so, the local storage section of a concatenator decodes the message to determine information about the recipient as well as determining a preferred destination data center to which the message segments should be routed. Previously received message segment(s) may then be transferred to a global storage section of the concatenator. If the global storage section of the concatenator is not located within the final destination data center, the current data center forwards the message segment(s) currently residing in the local storage section of the concatenator to a global storage section within a concatenator in the final destination data center. Through this process, the message segments are ultimately forwarded to the final destination data center, where the concatenator(s) at that data center can reassemble the message for transmission to the recipient. Thus, the ability to receive and re-assemble message segments of a message in a geo-redundant manner (e.g., across multiple data centers) for purposes of load distribution, redundancy, efficiency, and scalability is novel and unique.

These illustrative examples are mentioned not to limit or define the scope of this disclosure, but rather to provide examples to aid understanding thereof. Illustrative examples are discussed in this detailed description, which provides further description. Advantages offered by various examples may be further understood by examining this specification.

Reference is now made to the drawings, wherein like reference numerals are used to refer to like elements throughout. In the following description and for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations require physical manipulations of physical quantities. Usually, though not necessarily, these quantities take the form of electrical, magnetic, or optical signals capable of being stored, transferred, combined, compared, or otherwise manipulated. It proves convenient at times, principally for reasons of common usage, to refer to these signals as bits, values, elements, symbols, characters, terms, or numbers. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

FIG. 1 shows a block diagram of a system 100 for segmented messaging in a communications network 101. A communications network 101 may be a combination of one or more wired and/or wireless networks, including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network (e.g., 802.11 WiFi), a cellular network, and other communications networks. The example system 100 includes one or more client devices 105, 110 that may be an end user device such as mobile device, an Internet of Things (IoT) device (e.g., a smartphone, tablet, phablet, gaming device, laptop, personal computer (PC), automotive device, smart watch, smart security system, etc.), or any other suitable endpoint. The client devices 105, 110 shown in FIG. 1 may be in communication with an SMS provider 115 and send an SMS message to the SMS provider 115 via wireless infrastructure 111. The SMS Provider 115 may embody or include a short message service center (SMSC) 116 that is configured to handle the SMS operations of a wireless network. Also shown is an external short messaging entity (ESME) 117. An ESME 117 may be configured to send and receive messages with an application server 118. One characteristic of an ESME 117 is that it implements TCP/IP rather than wireless protocols and may be communicable with application servers acting as endpoints for purposes of sending and receiving SMS messages. SMS involving ESMEs typically allow for a client device 105 to communicate with applications as opposed to other client devices. This is often referred to as application-to-person (A2P) or vice versa. For instance, receiving an SMS from a doctor's office (e.g., application server) confirming an upcoming appointment is an example of an A2P message that involved an ESME in the transmission path.

As described above, client devices 105, 110 can send messages to each other, e.g., SMS or multimedia messaging service (MMS) messages, via wireless infrastructure 111 and/or network 101 depending on whether multiple service providers are involved. However, due to size limits on certain types of messages, the messages may be broken up into message segments and each message segment may then be sent over network 101. To enable the client device 105 to send messages to another device, the client device 105 includes instructions (e.g., software) to encode and format the messages for transmission over network 101. For instance, the client device 105 may include an application program interface (API) that integrates SMS text functions into a particular application. Messaging APIs (e.g., SMS APIs, MMS APIs, REST APIs, etc.) can enable a number of additional functions such as emojis, access to pictures, audio or video clips, notifications, or any combination of these. In some examples, the client device 105 may send a group message to multiple end user devices substantially simultaneously. Group messages may include a number of types of messages such as SMS, MMS, conference, reminder, notification, or a combination of these.

In some examples, the client device 105 may access APIs through software applications stored in a local memory. In other examples, the client device 105 may retrieve an API from one or more libraries associated with a particular messaging application. And in some examples, the client device 105 may include a messaging API that provides contextual information in a message or message segment. For example, the messaging API may provide profile information associated with the client device 105, which may include, for example, user information associated with a user or users of the client device 105, authentication information, billing information, a network address associated with message (e.g., an origination point or internet protocol (IP) address), encryption information, transcoding information, segmentation information, a timestamp, or any combination of these. Further, the messaging API may encode a message sent by a user of the client device 105 by incorporating such profile information into each message or message segment (e.g., a header, body, field, or a combination of these).

In one example, an API may break messages up into multiple message segments and attach metadata to the message segments to help those message segments be delivered to the right place and to be reassembled into the full message. For example, the client device 105 may include a messaging API that provides segmentation information associated with the message. The segmentation information may indicate a number of message segments associated with a message, an ordering of the message segments, etc. For example, the messaging API may determine that a message includes more than 160 characters and requires more than one message segment to be sent to the recipient client device (e.g., client device 110). In this case, the messaging API may encode a packet header of the multiple message segments of the SMS message with segmentation information that indicates the number of message segments included in the message and their particular sequence in the message.

In some examples, the messaging API may include information referred to as a "message identifier." In one example, a message identifier may be included in a packet header of each message segment of the message. Such a message identifier may include segmentation information associated with each of the message segments. In addition, the message identifier may include information associated with a particular source (e.g., gateway, router, geographic region, destination address, customer, or client device). And in some examples, the message identifier may include network constraints or assignments that bind a particular client device to a particular routing pathway, gateway, router, network device, geographic region, or destination address. In some examples, the segmentation information may include the location of a next hop and/or a location of the final destination of the message (e.g., client device 110). In one example, the segmentation information may indicate the next hop is data center 120.

In some examples, a client device 105 may access a stored lookup table to determine a message identifier associated with the SMS message. Further, in some examples, the lookup table may be remotely located, and the message identifier may be predetermined by a remote computing device. In this example, the remote computing device may assign a bind to one or more network devices, e.g., the client device 105, client device 110, SMSC 116, data center 120, or any combination of these. In some examples, the remote computing device may assign binds to network devices in the stored lookup table based on a hop count between devices, network speed, network latency (e.g., an available amount of throughput), hop limit (e.g., a maximum number of hops allowed between an origination point and a final destination), routing table, hash function, IP address, or a combination of these. And in some examples the client device 105 can encode message segments with the message identifier.

In some examples, the messaging API of the client device 105 may enable one or more security protocols. And in some examples, the messaging API of the client device 105 may add security information to packet headers associated with each of the one or more message segments. For example, the messaging API may encrypt a message segment of a message based on a particular protocol. In one example, the messaging API may employ a secure sockets layer (SSL) or transport layer security (TLS) protocol. In other examples, the messaging API may encode a message segment using cryptographic information associated with a virtual private network (VPN). And in some examples, the messaging API may employ a combination of cryptographic techniques for additional security. For example, the messaging API may encrypt one or more packets of a message and then send the packet(s) using an encrypted VPN.

Returning to the example system 100, the client device 105 is in communication with the SMS provider 115, which receives messages or message segments and acts as an external gateway, routing messages or message segments to a data center 120 via network 101. The data center 120 receives the messages or message segments from the SMS provider 115, concatenates message segments into a concatenated message, and sends the concatenated message or messages to a final destination, e.g., client device 110. In some examples, the data center 120 may be capable of processing large quantities of message segments from a multitude of client devices.

In this example, a user sends an SMS message from the client device 105 to another client device (e.g., client device 110) via network 101. To send the SMS message to client device 110, the client device 105 sends message segments of the SMS message to the SMS provider 115 via wireless infrastructure 111, which receives the message segments. In turn, the SMS provider 115 routes the message segments to the data center 120 via network 101. In some examples, the SMS provider 115 may route the message segments to another destination (e.g., another gateway, router, or any other intermediary network location or device). But in this example, the SMS provider 115 is in communication with the data center 120 and sends the message segments to the data center 120. To send the messages to the data center 120, the SMS provider 115 determines, based on segmentation information associated with the message segments, that the data center 120 is the next hop along the path to the recipient, client device 110.

Referring now to the data center 120, which receives the message segments from the SMS provider 115, concatenates the message segments, and sends a concatenated message back to the SMS provider 115 via network 101 for delivery to the recipient client device 110. The data center 120 shown in FIG. 1 includes several components, including gateway 145, concatenator 125, local storage 130, global storage 135, processor 140, message broker 150, and router 155. In some examples, the components of the data center 120 may be hardware devices, but in some examples, each of the components of the data center 120 can include one or more software applications or virtual machines being executed by one or more processors 140.

In the example system 100, the data center 120 receives the message segments from the SMS provider 115 via the gateway 145. The gateway 145 then sends the message segments to the concatenator 125. The concatenator 125 stores the message segments in the local storage 130. The concatenator 125 then determines a total number of message segments associated with the SMS message based on the segmentation information associated with the received message segments. Based on the total number of message segments associated with the SMS message, the concatenator 125 determines whether all of the message segments have been received. In this example, all of the message segments are sent to data center 120, and so, after receiving all of the message segments, the concatenator 125 concatenates all of the message segments into the concatenated message and sends the concatenated message to the processor 140. In some examples, the data center 120 may include more than one gateway 145, which receive message segments from the SMS provider 115.

In this example, the data center 120 includes the concatenator 125, though in some examples, the concatenator 125 may be located remotely. The concatenator 125 receives the message segments and stores them in local storage 130. In some examples, the local storage 130 may be separate from the concatenator 125, but in this example, the local storage 130 is a portion of the concatenator 125. To store message segments, the concatenator 125 may employ a hashing function to hash the message segments and to generate a storage location, e.g., in a hash table associated with local storage 130. After storing the message locally, the concatenator 125 decodes the contents of the one or more message segments to obtain segmentation information. The concatenator 125 determines, based on the segmentation information, a number of message segments associated with the SMS message. The concatenator 125 then determines whether it has received each of the message segments of the SMS message.

In some cases, the concatenator 125 may wait to receive all expected message segments associated with an SMS message within a predetermined time period. After the time period elapses, the concatenator 125 then determines whether additional message segments arrived or not. If the concatenator 125 received all expected message segments, then it concatenates the message segments to reconstruct the original message. In some examples, the concatenator 125 may encode the concatenated message according to any of the communications protocols discussed herein (e.g., SMPP). And in some examples, the concatenator 125 may encode the concatenated message with segmentation information, a portion of the segmentation information, final destination information, profile information, authentication information, cryptographic information, or a combination of these. The concatenator 125 can then provide the concatenated message to a processor 140. However, in some examples, the concatenator 125 may only send a concatenated message to the processor 140 after all of the message segments have arrived.

The concatenator 125 is a passive collector of message segments. It relies on the hashing function to have message segments directed to local storage 130 where the concatenator 125 then looks for all the segments of a message at the end of a configured timeout. If one or more message segments are missing, the concatenator 125 will move the existing message segments to the global storage 135 section where another configured timeout will be started. Once that timer expires, if all the message segments have not arrived, the message is timed out.

In one example, based on a determination that message segments are missing, the concatenator 125 sends a NACK message to the SMS provider 115, which may then request the client device 105 resend the message segment(s). In some examples, the concatenator 125 may change the storage location of the received message segments (e.g., message segment 1 of 3 and message segment 2 of 3) from the local storage 130 to the global storage 135. For example, based on the message segment; 3 of 3 still being missing, after the time period has elapsed, the concatenator 125 may move message segment 1 of 3 and message segment 2 of 3 to global storage 135 to enable faster processing of message segments in the local storage 130.

In some examples, the local storage 130 may store complete messages, e.g., having a single message segment, and in order to facilitate a large volume of these shorter messages, the concatenator 125 or processor 140 may allocate a greater amount of processing power to process messages within a queue associated with the local storage 130. In some examples, the concatenator 125 may include one or more virtual machines allocated to processing message segments and messages in local storage 130. And in some examples, the concatenator 125 may store message segments in global storage 135 to de-queue tasks associated with the delivery of message segment 1 of 3 and message segment 2 of 3. In such a case, de-queuing message segments may provide additional processing capabilities to concatenator 125, thereby enabling more efficient processing of inbound messages. Further, in some examples described below, a concatenator may store message segments in global storage while a data center communicates with other data centers to determine whether another data center received a missing message segment, e.g., missing message segment 3 of 3.

The processor 140 receives the concatenated message from the concatenator 125. In some examples, the processor 140 may preprocess or precondition a concatenated message by performing similar tasks to those described above, with respect to the SMS provider 115, gateway 145, or concatenator 125. For instance, the processor 140 may encode, transcode, encrypt, packetize, or route a concatenated message. And in some examples, the processor 140 may perform additional tasks based on information associated with the concatenated message.

For example, the processor 140 may use profile information to perform additional tasks associated with a concatenated message. In one example, the processor 140 may authenticate a user based on profile information. In this example, the processor 140 may analyze user information associated with the client device 105 to determine one or more privileges associated with the client device 105. For instance, the processor 140 may send the concatenated message based on an authentication of the client device 105. In some examples, the processor 140 may use authentication information or billing information to determine whether the client device 105 is authorized to send and receive messages. In another example, the processor 140 may use authentication and/or billing information to determine an access level (e.g., a tier of service, a billing amount, an allowed amount of throughput data, an authorized network speed, an allotted number of message segments or messages, a bandwidth limitation, a time-of-day constraint, etc.) associated with client device 105 or a user of client device 105. In some examples, the processor 140 may modify a prioritization order associated with a message based on the access level of the user.

The processor 140 may also determine a prioritization order, maximum throughput speed, type of transmission protocol, maximum number of hops, or a combination of these for the concatenated message. In some examples, the processor 140 may prioritize transmission of the concatenated message based on an origination point, encryption information, transcoding information, segmentation information, a timestamp, or a combination of these. Further, the processor 140 may determine a prioritization order based on the final destination associated with a message.

For example, the processor 140 may receive a group message from the concatenator 125, which may have originated from the client device 105. A group message may include a number of types of messages such as SMS, MMS, conference, reminder, notification, or a combination of these. And if the processor 140 determines the concatenated message is a duplicate message or a group message that is being sent to multiple end user devices (in addition to the client device 110), the processor 140 may wait for a duration of a time period prior to sending the concatenated message. In some examples, the processor 140 may wait for a particular set of network conditions before sending the concatenated message.

And in some examples, the processor 140 may wait for one or more preconditions to be met before sending the concatenated message. In some examples, these preconditions may include an amount of available throughput along a particular routing path, a reduction in a number of inbound messaging requests, a total amount of network bandwidth to become available, a response from a network location associated with a preferred routing path, or a combination of these. In some examples, the processor 140 may send a group message based on one or more preconditions. For example, group messages may be subject to similar preconditions as those discussed above with respect to concatenated messages, but group messages may also be delivered over time. In such a case, an elongated delivery schedule associated with staggered queuing of messages may reduce an amount of network congestion across the network 101.

For example, the processor 140 may modify a prioritization order of one or more concatenated messages based on network conditions. In one example, the processor 140 may determine a requisite minimum amount of available throughput before sending the message. In another example, the processor 140 may prioritize one concatenated message over another based on network conditions associated with one or more routes required to reach the end user devices. For example, if a client device 105 was associated with a customer account that included a performance-based contractual requirement (e.g., a service level agreement (SLA)), which required a maximum average delivery time associated with messages originating from the client device 105, then message segments or messages from the client device 105 may be prioritized by the processor 140 over a client device (e.g., client device 110) that was not associated with such a contractual requirement. The processor 140 may also send the concatenated message to a message broker 150 such as, for instance, a NATS server. NATS is a customized family of open source products comprising a messaging system or message broker.

A router 155 may receive the concatenated message from the processor 140 and remaps address information associated with the concatenated message. For example, router 155 may employ historical network conditions to predict traffic flow across network 101. In some examples, router 155 may change a network address that is associated with the concatenated message. In one example, router 155 may determine the concatenated message includes a message identifier that indicates a destination IP address associated with the recipient. Concatenated messages may then be routed to ESMEs 117 for A2P traffic, or provider/aggregator SMSCs 116 that in turn send messages to client devices 110. In this example, router 155 may determine that network conditions associated with the IP address are poor or otherwise suboptimal (e.g., having an unusual amount of network congestion or being associated with a high-traffic time of day).

Router 155 may change a message identifier associated with a message or message segment by assigning a different IP address to the message identifier. Router 155 can dynamically assign various types of network addresses into different types of addresses via transcoding or by dynamically reassigning particular addresses based on network conditions. For example, router 155 may transcode addresses using any number of message protocols such as IP, IPv4, IPv6, transmission control protocol (TCP), user datagram protocol (UDP), etc. In some examples, router 155 may transcode a particular address to enable messages to traverse portions of a network that require a specific encoding technique. In some examples, router 155 may selectively assign an address based on a number of available network addresses within a pool. And in some examples, router 155 can selectively assign addresses based on the performance of load balancing tasks across network 101.

For example, gateway 145 holds the TCP connections and may monitor network conditions in substantially real time, including available bandwidth, latency, or other network conditions. The gateway 145 may then report such conditions for each bind to router 155 which has aggregate visibility across all the gateways. The router 155 may then pick the best route to the destination whether ESME 117 for receipts, or SMSC 116 for messages.

In some examples, router 155 may increase network flexibility by dynamically modifying network traffic patterns and data flow by changing one or more addresses associated with one or more messages. For instance, gateway 145 may determine a particular IP address associated with ESMEs or SMSCs which, in turn, service the client devices 105, 110 based on message identifiers. Gateway 145 may also determine that the particular IP addresses associated with the client devices 105, 110 correspond to locations associated with network congestion or a network failure, and inform the router 155. Router 155 may then determine one or more alternate IP addresses for either or both client devices 105, 110 based on network conditions. Router 155 can then assign the one or more alternate IP address to either or both client devices 105, 110 by changing the IP address contained within the message identifiers associated with client devices 105, 110.

In some examples, router 155 may be a router cluster (e.g., a set of interconnected routers 155) that is capable of implementing complex data flow patterns to optimize network traffic and minimize a delay associated with the concatenated message between the client device 105 and the client device 110. Such a router cluster may improve uptime or delivery rates, while reducing network congestion. Router clusters can pool processing resources (e.g., multiple processors, servers, computing devices, neural networks, neural training data sets, etc.) to increase a speed with which an optimum path may be determined. Once router 155 has identified an optimal routing pathway, it can send the concatenated message to the gateway 145 with a routing pathway recommendation.

The router 155 receives the modified concatenated message from message broker 150 and sends the modified concatenated message to the gateway 145. In some examples, the router 155 may determine a next hop or routing path based on a path identified by message broker 150. In other examples, the router 155 may determine a next hop based on network conditions. And in some examples, the router 155 may receive information associated with network conditions based on segmentation information in the modified concatenated message. Further, the router 155 may determine a next hop or routing path by utilizing information associated with a timestamp, an IP address associated with an origination point, or hop information associated with the segmentation information and/or from client device 105. In some examples, the router 155 may use detected signal strengths, available networks, protocol and buffer statistics and analysis, environmental and/or geographical factors, the performance of access points and other network components, past interactions between or among communication devices, access points and other network components, contextual information associated with content contained within the concatenated message, other information described herein, or a combination of these to determine a next hop, routing path, or other transmission path for the modified concatenated message.

In one example, the router 155 physically or logically connects communication links differently. The router 155 may also monitor network conditions and receive substantially real time data from the processor 140 regarding network conditions. And in some examples, the router 155 may establish a communication session to initiate a transmission of very large messages or messages to a large number of recipients. However, in this example, the router 155 sends the modified concatenated message to the gateway 145, and in turn, the gateway 145 sends the modified concatenated message to the next hop, which is the SMS provider 115 in this example.

Figure 2:
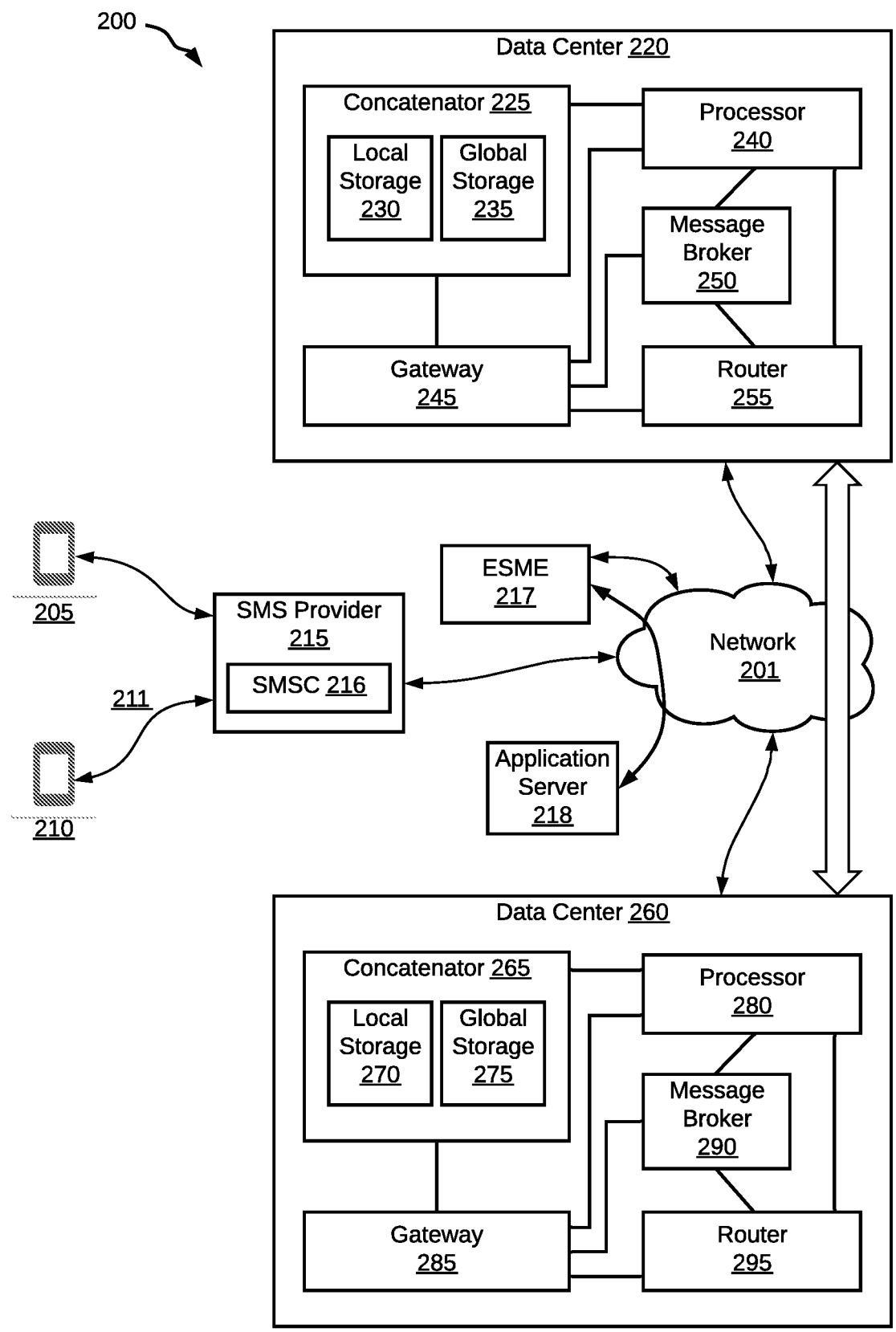
FIG. 2 shows another example of a system for segmented messaging in a communications network according to this disclosure.

FIG. 2 shows a block diagram of one example system 200 for segmented messaging in a communications network 201. The system 200 includes a client device 205 that sends messages to the client device 210. The client devices 205, 210 may be substantially similar to the client devices 105, 110, each of which may be in wired or wireless communication with an SMS provider 215 via wireless infrastructure 211 that can be cellular or WiFi based. SMS provider 215 may further comprise SMSC 116 configured to handle the SMS operations of a wireless network. Also shown is ESME 217 communicable with one or more application servers 218. The system 200 also includes data centers 220 and 260, which are each communicatively coupled to the SMS provider 215 and to each other via network 201. The data centers 220, 260 include concatenators 225, 265, local storages 230, 270, global storages 235, 275, processors 240, 280, gateways 245, 245, message brokers 250, 290, and routers 255, 295, respectively. The data centers 220, 260 are generally as described above with respect to data center 120 in FIG. 1.

In this example, a user of client device 205 may send a message to another client device 210 through network 201. As before, network 201 may be a combination of one or more wired and/or wireless networks, including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network (e.g., 802.11 WiFi), a cellular network, and other communications networks.

The client device 205 may encode and send each message segment of the message segmented message to the SMS provider 215 generally as discussed above with respect to FIG. 1. The SMS provider 215 then receives and routes message segments of the message via SMSC 216 to a destination communicatively coupled to network 201, e.g., data centers 220, 260. In this example, the SMS provider 215 sends each message segment of the message to either data center 220 or data center 260.

For example, the SMS provider 215 may receive a two-part message from the client device 105. After the SMS provider 215 receives message segment 1 of 2, the SMS provider 215 may send the message segment based on information associated with the message. For example, the SMS provider 215 may determine whether the message segment 1 of 2 includes a particular routing policy or protocol associated with the message segment. In some examples, the SMS provider 215 may decode segmentation information that is included with the message segment 1 of 2 to determine where to send the message segment. In some examples, the segmentation information may include a particular codec or form of encryption that the SMS provider 215 can decode or decrypt. And in some examples, decoded or decrypted segmentation information may indicate the next hop is data center 220 or data center 260 based on network conditions, a time of day, a hop count, network speed, network latency, load balancing, a hop limit, routing table, hash function, IP address, or a combination of these.

In one example, the SMS provider 215 may determine that message segment 1 of 2 includes instructions to send each message segment of the message according to a hashing function. For instance, the SMS provider 215 may assign a hash value to each message segment of each message received by the SMS provider 215. In this case, the SMS provider 215 may assign a first hash value associated with data center 220 and a second hash value associated with data center 260 in a sequential and alternating manner. If the SMS provider 215 were to alternate sequentially in such a manner, the two sequential message segments (e.g., message segment 1 of 2 and message segment 2 of 2) would be assigned hash values associated with each of the two different data centers 220, 260. And the SMS provider 215 may send each of the message segments based on their assigned hash value.

In some examples, the SMS provider 215 may send the message segment 1 of 2 based on information obtained by the SMS provider 215. For example, the SMS provider 215 may monitor messaging traffic and/or messaging requests over time. In some examples, the SMS provider 215 may determine a number of messaging requests received within a particular time period. Based on the number of messaging requests over the time period, the SMS provider 215 may determine whether to route each message segment of the message to data center 220 or data center 260. In some examples, the SMS provider 215 may make such a determination based on network conditions, an elapsed time associated with one or more messaging requests, an amount of data associated with the messaging requests, or a combination of these. In any of these cases, the SMS provider 215 may send the message to either data center 220 or data center 260.

In one example, the SMS provider 215 may receive a two-part message from the client device 205. In this example, the SMS provider 215 sends one of the two message segments to each of the different data centers 220, 260. For example, the data center 220 may receive message segment 1 of 2 of the message and data center 260 may receive message segment 2 of 2 of the same message. Each of the data centers 220, 260 may store their respective message segments in local storages 230, 270. The data centers 220, 260 may wait for a duration of time for their respective missing message segment. And after the duration of time expires, each of the data centers 220, 260 may move the respective message segments into global storages 235, 275. In some examples, either or both of the data centers 220, 260 may decode their respective message segment to determine a final destination (e.g., client device 210) associated with the message. And in some examples, each of the data centers 220, 260 may send their respective message segment to the other data center based on the final destination.

For instance, the data center 220, having message segment 1 of 2 of the message, may determine the final destination of the message is the client device 210. In some examples, the data center 220 may determine that the concatenator 225 is a closest network location proximate to the final destination based on network conditions. Determining the closest network location may be based on a predetermined delivery parameter (e.g., a best effort, maximum time delay, maximum number of retries, service level agreement, billing rate, target delivery times, etc.). And the closest network location can be determined based on a shortest path, fastest route, physical distance, maximum number of hops, available throughput, network congestion, or any other network conditions discussed herein.

In this example, the data center 220 sends a query message to the data center 260 to determine whether data center 260 received message segment 2 of 2 of the message. In response, the data center 260 sends a response to data center 220 that indicates message segment 2 of 2 was received by the data center 260. In some examples, the data center 260 may send an acknowledgement and/or confirmation of the receipt of message segment 2 of 2 to the data center 220. In turn, the data center 220 may request and receive message segment 2 of 2 from data center 260 based on the acknowledgement and/or confirmation. In another example, the concatenator 265 of data center 260 may send message segment 2 of 2 to the data center 220 via gateway 275 in response to the query. Gateway 235 of data center 220 may receive message segment 2 of 2 and send message segment 2 of 2 to the concatenator 225. In some examples, the gateway 235 may send message segment 2 of 2 directly to global storage 235 of concatenator 225 based on address information associated with the transmission from data center 260.

As mentioned above, after a time period expires, the concatenator 225 may move message segments into global storage 235. In this example, the concatenator 225 does so, storing message segment 1 of 2 in global storage 235. In some examples, the concatenator 225 can queue message segment 1 of 2 in global storage 235 for faster processing of message segments 1 of 2 and 2 of 2 upon the arrival of message segment 2 of 2. And in some examples, the concatenator 225 may enable faster processing of other inbound message segments in the local storage 230 by de-queuing message segment 1 of 2 from the local storage 230. Further, in some examples, the concatenator 225 may de-queue message segment 1 of 2 at substantially the same time as message segment 1 of 2 is moved to global storage 235. In this example, the concatenator 225 stores message segment 1 of 2 in global storage 235, and places message segment 1 of 2 in a queue for expedited delivery of concatenated messages. Thus, when message segment 2 of 2 arrives, the concatenator 225, having both message segments 1 of 2 and message segment 2 of 2, concatenates message segments 1 of 2 and 2 of 2 faster and sends the concatenated message to the processor 240.

In some examples, the concatenator 225 may queue message segment 1 of 2 in preparation for the arrival of message segment 2 of 2. By queuing message segment 1 of 2, the concatenator 225 may provide faster processing, e.g., a quicker response time associated with concatenating the two-part message when message segment 2 of 2 arrives. And when message segment 2 of 2 is received by the concatenator 225, a total amount of time associated with the concatenation may be reduced, thereby reducing a total amount of time associated with the delivery of the concatenated message, which includes message segments 1 of 2 and 2 of 2. And in this example, after receiving both message segment 1 of 2 and message segment 2 of 2, the concatenator 225 determines that it has received all message segments of the message and concatenates the message segments to re-create the original message. The data center 220 then sends the concatenated message to the client device 210 according to any of the techniques described herein.

In yet another example, and in response to a substantially similar query message described above, the data center 220 may receive an indication that message segment 2 of 2 was not received by the data center 260. In some examples, when the data center 220 receives such a message from the data center 260, the data center 220 may send a request for retransmission of message segment 2 of 2 to the SMS provider 215 or to client device 205. In some examples, the data center 260 may receive the message segment 2 of 2 after sending a response to data center 220. In this example, the data center 260 may send a subsequent message to data center 220 indicating subsequent receipt of the message segment 2 of 2, and at that time, the data center 220 may send a request to data center 260 for transmission of message segment 2 of 2. Data center 220 may then receive message segment 2 of 2, concatenate both message segments, and send the concatenated message according to any of the techniques described herein.

Figure 3:
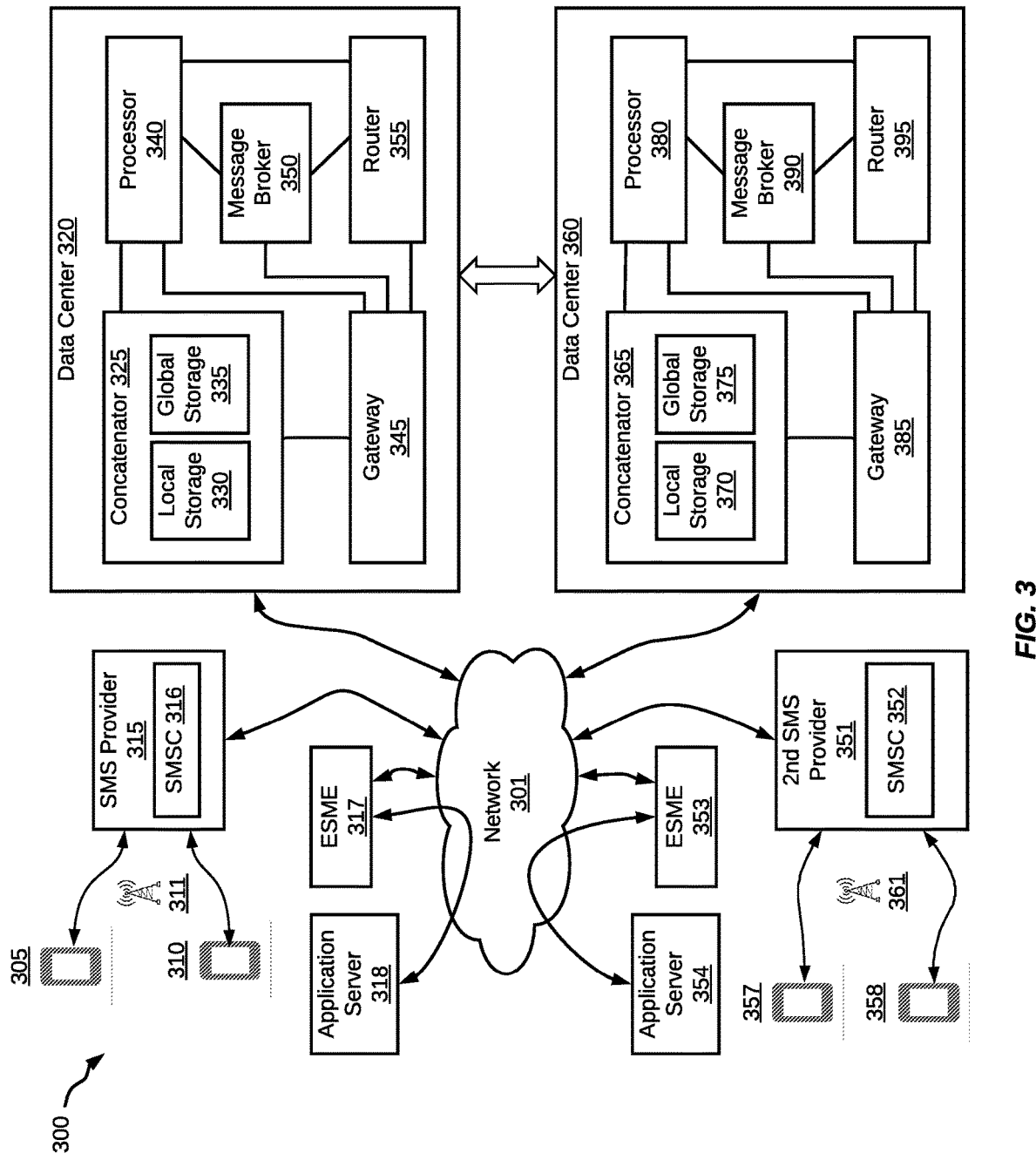
FIG. 3 shows another example of a system for segmented messaging in a communications network according to this disclosure.

FIG. 3 shows another example of a system 300 for segmented messaging in a communications network 301. The system 300 includes the client device 305 that can exchange SMS text messages with a client device 310 or an application server 318. As before the client device 305 may be in wired or wireless communication with the SMS provider 315 and SMSC 316. An ESME 317 communicable with application server 318 is also shown to indicate the potential for A2P message exchanges. The system 300 also includes data centers 320 and 360, which are communicatively coupled to one another and to the SMS provider 315 via network 301. As discussed above, the data centers 320, 360 include concatenators 325, 365, local storages 330, 370, global storages 335, 375, processors 340, 380, gateways 345, 345, and routers 355, 395, respectively. In some examples, each of the components of system 300 may perform substantially similar functions to those described above, with respect to substantially similar counterpart components described in FIGS. 1 and 2. But in this example, the client device 310, data center 320, and data center 360 are also in wired or wireless communication with a second SMS provider 350 and SMSC 352 as well as other ESMEs 353 and application servers 354.

Users of client devices 305, 310 may subscribe to communications services associated with a particular message service providers (e.g., SMS, MMS, or other text message providers). In some examples, service providers may provide one or more additional services, including cellular telephony services, cellular data services, broadband Internet services, television services, streaming video or audio services, etc. However, in this example, users of client devices 305, 310 subscribe to different message service providers. A second SMS provider 350 communicates with one or more client devices (e.g., client device 310) that subscribe to a different message service provider from the message service provider associated with SMS provider 315.

In this example, the second SMS provider 350 communicates with the client device 310 via any suitable wired or wireless connection over network 301. And in this example, the second SMS provider 350 may receive a concatenated message from either of data centers 320, 360 and route the concatenated message to a final destination (e.g., client device 310). In some examples, the data centers 320, 360 may route concatenated messages to the second SMS provider 350 based on one or more network conditions (e.g., load balancing, network coverage, signal strength, network congestion). And in some examples, the data centers 320, 360 may route concatenated messages to the second SMS provider 350 based on a cost associated with delivering the message. Further, the data centers 320, 360 may route concatenated messages to the second SMS provider 350 based on profile information or a user preference (e.g., a preferred network provider) associated with the client device 310.

The second SMS provider 350 may communicate with the client device 310 via any suitable wired or wireless connection. In this example, the second SMS provider 350 may receive a concatenated message from either of data centers 320, 360 and route the concatenated message to a final destination (e.g., client device 310). In some examples, the data centers 320, 360 may route concatenated messages to the second SMS provider 350 based on one or more network conditions (e.g., load balancing, network coverage, signal strength, network congestion). And in some examples, the data centers 320, 360 may route concatenated messages to the second SMS provider 350 based on a cost associated with delivering the message. Further, the data centers 320, 360 may route concatenated messages to the second SMS provider 350 based on profile information or a user preference (e.g., a preferred network provider) associated with the client device 310.

Figure 4:
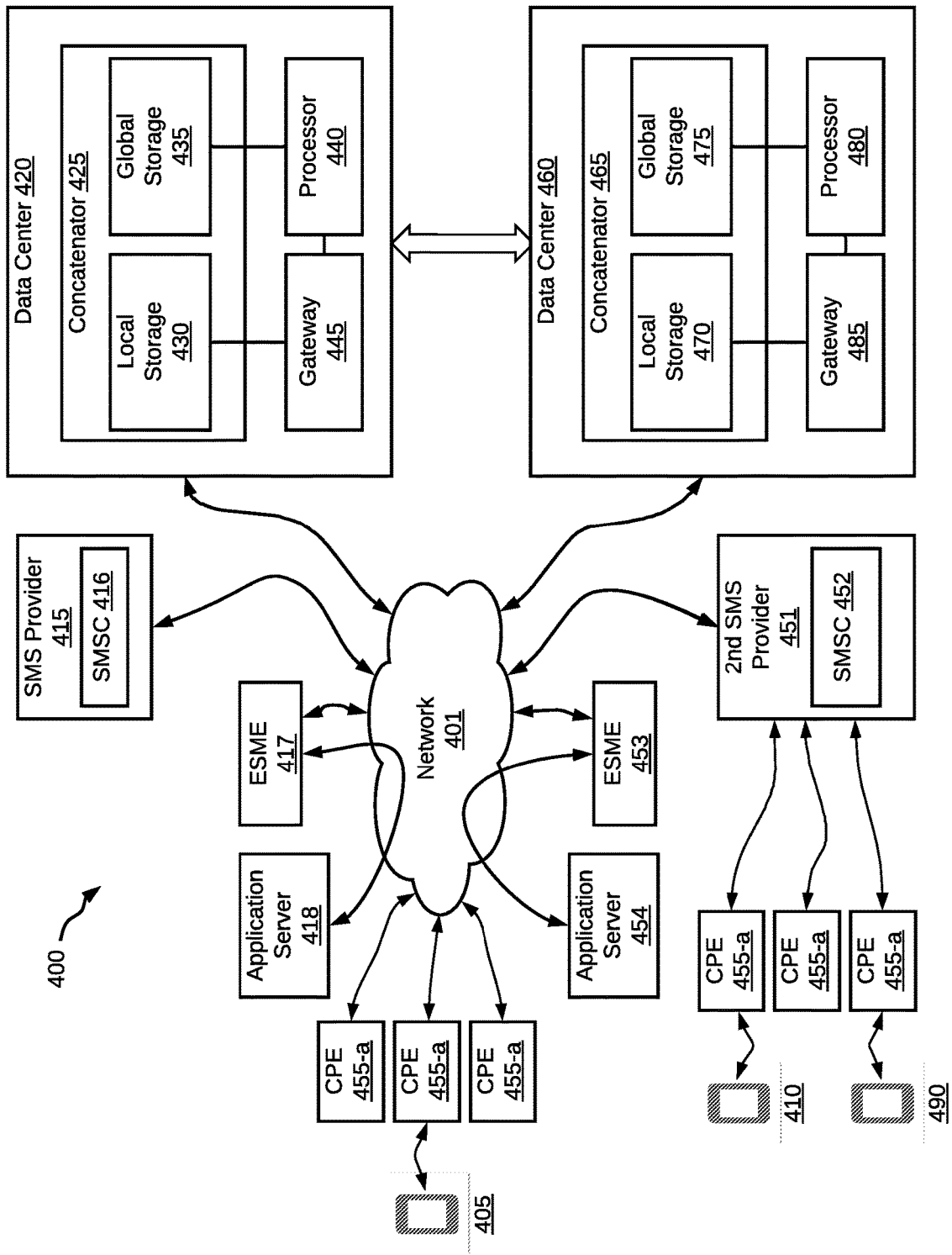
FIG. 4 shows yet another example of a system for segmented messaging in a communications network according to this disclosure.

Referring now to FIG. 4, which shows yet another example of a system 400 for segmented messaging in a communications network 401. The system 400 includes a client device 405, which may be in communication with SMS provider 415 and SMSC 416 as well as client devices 410 and 490 via network 401. The client devices 410 and 490 may also be in communication with a second SMS provider 450 and SMSC 452. ESMEs 417, 453 and application servers 418, 454 are shown and included for A2P type messaging. The system 400 also includes data centers 420, 460, which are communicatively coupled to one another, to the SMS provider 415, and to the second SMS provider 450. The data centers 420, 460 include concatenators 425, 465, local storages 430, 470, global storages 435, 475, processors 440, 480, and gateways 445, 485, each of which may include all of their respective features discussed above. However, in system 400, the client device 405 may also be in wired or wireless communication with customer premises equipment (CPEs) 455-a, 455-b, and/or 455-c, and similarly, the client devices 410 and 490 may also be in wired or wireless communication with CPEs 495-a, 495-b, and/or 495-c. In some examples, the second SMS provider 450 may include substantially similar capabilities to those discussed above, with respect to the second SMS provider 350 shown in FIG. 3.

The SMS provider 415 may receive message segments of a message from the client device 405 and route the message segments to data centers 420, 460. However, in this example, the SMS provider 415 may also receive message segments of a message from the CPEs 455-*a*, 455-*b*, or 455-*c* and route the message segments to data centers 420, 460. For example, the CPEs 455-*a*, 455-*b*, or 455-*c* may include one or more WiFi networks. And the client device 405 may determine a location of a particular CPE (e.g., CPE 455-*a*, 455-*b*, or 455-*c*) based on a proximity to one or more WiFi networks or based on one or more network conditions (e.g., one or more of a signal strength, a data limit, user preference associated with a particular network condition, etc.).

In this example, the client device 405 may send message segments of a message to the SMS provider 415 via a particular customer. And the system 400 shows the client device 405 may send message segments to the SMS provider 415 using a network connection (e.g., an access point) through the wireless network 401 associated with CPE 455-*b*. In some examples, the client device 405 may utilize a plurality of CPEs, in series or in parallel, to send message segments of a message to the SMS provider 415. And in some examples, the client device 405 may utilize a network connection associated with a CPE to reduce an amount of cellular data usage. In addition, a cellular service provider may receive the message from the client device 405 and send the message to one or more CPEs (e.g., CPEs 455-*a*, 455-*b*, or 455-*c*) to reduce network congestion.

In one example, the client device 405 sends a message segmented to message to the CPE 455-*b*, which may bypass the SMS provider 415. For example, the client device 405 may include a messaging API that encodes the message segments with instructions that cause the client device 405 to send the message to data centers 420 or 460 directly from the CPE 455-*b*. For instance, if the client device 405 determined the SMS provider 415 was offline, caused by a local network outage (e.g., experiencing network downtime), the client device 405 may encode message segments with instructions to bypass the SMS provider 415. In either case, the SMS provider 415 and/or the CPE 455-*b* can send the message segments to the data centers 420, 460.

The data centers 420, 460 may also receive, via gateways 445, 485, group messages sent from the client device 405. In one example, the client device 405 may send a message to client devices 410, 490 substantially simultaneously. Further, the message may include multiple message segments of an SMS message sent in accordance with SMPP protocol. The data centers 420, 460 may process these group messages using processors 440, 480 according to any of the techniques discussed herein. In some examples, the processors 440, 480 may prioritize an order of delivery for group messages based on network conditions. For instance, the processors 440, 480 may determine that current network conditions are suboptimal for transmission of a group message associated with a large quantity of data or requiring delivery to a large number of client devices. Based on such a determination, the processors 440, 480 may wait for a time period, monitoring network conditions (e.g., network congestion) before sending the group message.

The second SMS provider 450 may receive concatenated messages from the data centers 420, 460. In some examples, the data centers 420, 460 may route concatenated messages through the second SMS provider 450 and to either of the client devices 410, 490, or both. In some examples, the data centers 420, 460 may route concatenated messages based on conditions associated with the delivery of the concatenated messages, such as network conditions, cost, profile information, user preferences, or a combination of these.

The second SMS provider 450 may also provide the concatenated message to the client devices 410, 490 via one or more CPEs (e.g., CPEs 495-*a*, 495-*b*, and/or 495-*c*). And the second SMS provider 450 may send the concatenated message using a network connection of CPEs 495-*a*, 495-*c*. In some examples, the second SMS provider 450 may utilize a plurality of CPEs, in series or in parallel, to send a message to the client devices 410, 490. And in some examples, the second SMS provider 450 may utilize these network connections to reduce an amount of network traffic, to increase reliability through redundancies, or to reduce a delivery time associated with the concatenated message.

In one example, the data centers 420, 460 may send a group message to the client devices 410, 490 via CPEs 495-*a*, 495-*c*. In this example, the data centers 420, 460 may bypass the second SMS provider 450 altogether. For example, the data centers 420, 460 may determine that a closest network location and/or routing path includes one or more of CPEs 495-*a*, 495-*b*, or 495-*c*. And the data centers 420, 460 may also determine, based on network conditions, that a routing path that includes the second SMS provider 450 is suboptimal. In this example, the data centers 420, 460 may send the concatenated message to client devices 410, 490 via one or more of CPEs 495-*a*, 495-*b*, or 495-*c*.

Figure 5:
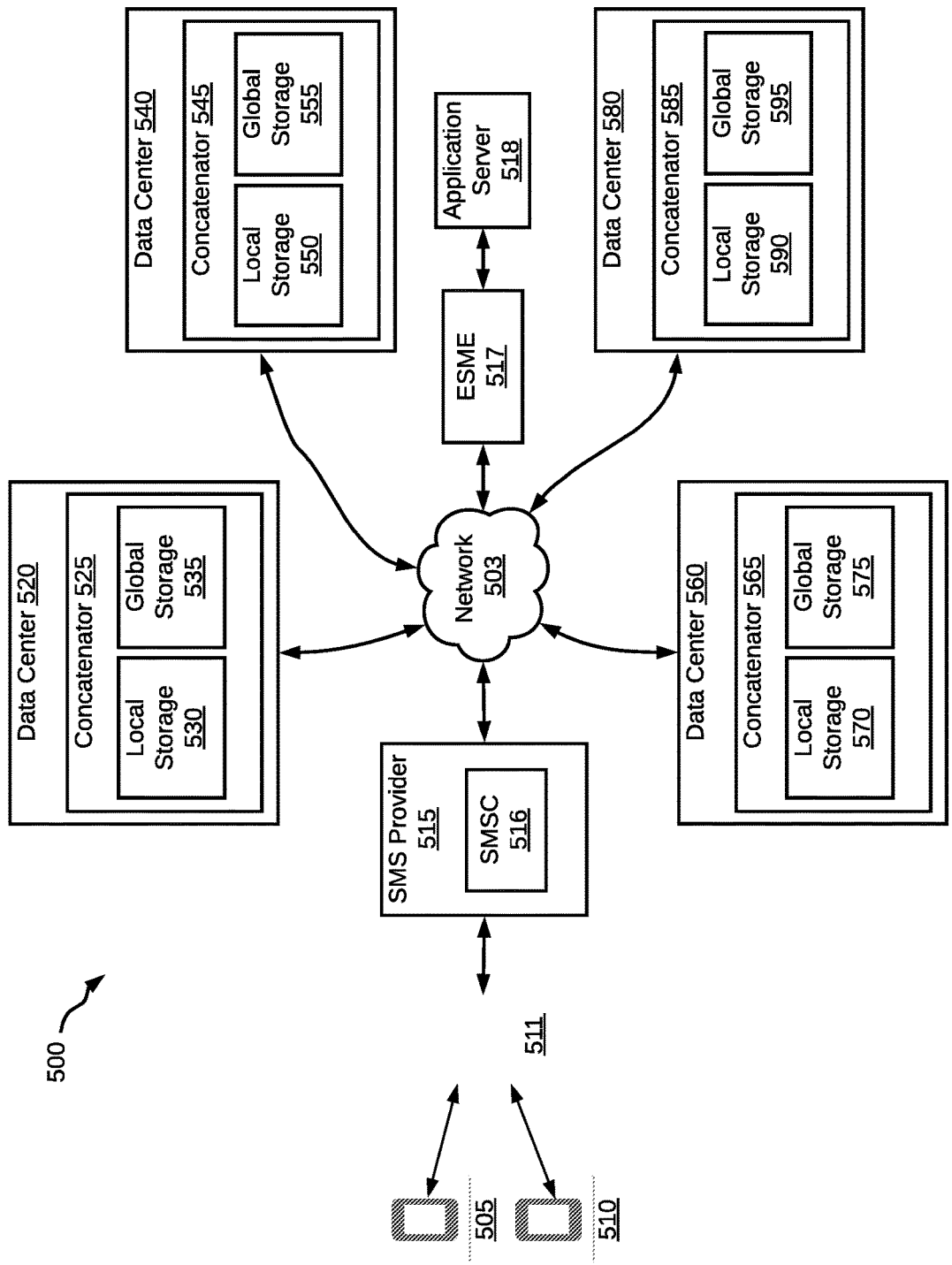
FIG. 5 shows yet another example of a system for segmented messaging in communications networks according to this disclosure.

Referring now to FIG. 5, which shows yet another example of a system 500 for segmented messaging in communications network 503. The system 500 includes client devices 505, 510 which may be in wireless communication with an SMS provider 515 and client device 510 via wireless infrastructure 511 and communications network 501. The system 500 also includes data centers 520, 540, 560, and 580, which are in wired communication with one another and SMS provider 515 via network 503. The data centers 520, 540, 560, and 580 include concatenators 525, 545, 565, and 585, local storages 530, 550, 570, and 590, and global storages 535, 555, 575, and 595, respectively, and each of which may include all of their respective features discussed above.

In this example, the SMS provider 515 receives message segments of a message from the client device 505 and routes the message segments to data centers 520, 540, 560, 580. However, in this example, the SMS provider 515 can route the message segments to data centers 520, 540, 560, 580 based on prevalent network conditions. For example, the SMS provider 515 may route message segments to a data center that is the closest network location based on a physical proximity (e.g., data center 520 is the geographically closest network location). However, the SMS provider 515 may also route message segments to a data center based on network latency, a load-balancing criterion, or a set of load-balancing criteria. In one example, the SMS provider 515 may route the message segments based on a shortest path in time between the SMS provider 515 and any of the data centers 520, 540, 560, 580. In some examples, the SMS provider 515 may dynamically determine the shortest path associated with data centers 520, 540, 560, 580, updating the shortest path based on continuously monitored network conditions. And in some examples, the message provider may employ a particular routing protocol to determine the shortest path (e.g., routing information protocol (RIP), open shortest path first (OSPF), or enhanced interior gateway routing protocol (EIGRP)).

In this example, SMS provider 515 receives message segments of a message from the client device 505 and routes the message segments to data centers 520, 540, 560, 580 using a hashing function. For example, the SMS provider 515 being connected to data centers 520, 540, 560, 580, may distribute inbound message segments from client devices (e.g., client device 505) equally by applying a hash value to each incoming message. In this case, the SMS provider 515 may route each incoming message segment by applying a hash value to each message segment and routing the message segments accordingly.

In one example, a user of the client device 505 sends a four-part MMS message to a recipient, client device 510. In this example, the SMS provider 515 receives four message segments associated with the MMS message sequentially (e.g., first message segment 1 of 4, second message segment 2 of 4, third message segment 3 of 4, and fourth message segment 4 of 4). The SMS provider 515 may include pre-stored hash values associated with each of the data centers 520, 540, 560, 580. For example, the SMS provider 515 may include a lookup table that assigns hash values based on a predetermined order of distribution. In one example, data centers 520, 540, 560, 580 may be labeled as "DC1," "DC2," "DC3," and "DC4," respectively. Having received the message segments sequentially, the SMS provider 515 may also distribute the message segments sequentially based on the order above. For example, SMS provider 515 may route message segment 1 of 4 to DC1, message segment 2 of 4 to DC2, message segment 3 of 4 to DC3, and message segment 4 of 4 to DC4 using the hash function described above.

In this example, each of the data centers 520, 540, 560, and 580 receive their respective message segments from the SMS provider 515. And each of the data centers 520, 540, 560, and 580 store their respective message segments in their respective local storages 530, 550, 570, and 590 of their respective concatenators 525, 545, 565, and 585. In some examples, each of the concatenators 525, 545, 565, and 585 within their respective data centers 520, 540, 560, and 580 may wait for a time period to determine whether one of their three missing message segments are received. However, in this example, each of the concatenators 525, 545, 565, and 585 determines there are missing message segments. So, after a predetermined time period elapses, each of the concatenators 525, 545, 565, and 585 moves their respective received message segment to their respective global storages 535, 555, 575, and 595. And in this example, each of the concatenators 525, 545, 565, and 585 decodes their respective message segment to obtain segmentation information associated with MMS message.

Further, in this example, the segmentation information indicates the final destination is client device 510. And based on the final destination, each of the data centers 520, 540, 560, 580 may determine whether it is the closest network location to the final destination, client device 510. In some examples, the segmentation information may include additional or alternative information than the final destination (e.g., a message identifier, a shortest path, an access level, a delivery time requirement, etc.). In some examples, the determination of the closest network location may be based at least in part on such additional or alternative information. But in this example, the data centers 520, 540, 560, 580 determine the closest network location to the final destination based on physical proximity. And in this example, the system 500 shows the data center 560 as being the closest network location based on physical proximity (e.g., short distance). In some examples, the closest network location may be determined based on a number of conditions (e.g., network traffic, time of day, maximum throughput, a number of users utilizing network resources, etc.).

The data center 560, having determined that it is the closest network location, may send one or more messages to one or more remote computing devices (e.g., SMS provider 515, data centers 520, 540, 580, or a combination of these) to ascertain a present location of each of the missing message segments. In this example, the data centers 520, 540, 580 each receive the message from data center 560, and in response, the data centers 520, 540, 580 send a corresponding acknowledgement (ACK) message to the data center 560. In some examples, the ACK message from each of the data centers 520, 540, 580 may include an identification of which message segment is present at their respective data center. In some examples, the ACK message may be accompanied by the missing message segment. However, in this example, the data center 560 receives the ACK message and segmentation information from each of the data centers 520, 540, 580. Based on the segmentation information, the data center 560 sends a request to data center 520 for message segment 1 of 4, data center 540 for message segment 2 of 4, and data center 580 for message segment 4 of 4.

The data centers 520, 540, 580 each receive the respective request from the data center 560. In this example, the concatenators 525, 545, and 585, prepare (e.g., encode or encrypt) and send their respective message segments across network 503 to data center 560. The data center 560 then receives each of the missing message segments. In some examples, the data center 560 may store each of the missing message segments in local storage 570 for a time period before moving the missing message segments to the global storage 575 and decoding the missing message segments, e.g., based on determining the message segments are missing message segments associated with a message segment stored in global storage.

In this example, the data center 560 determines an origination location for each message based on origination information encoded from the data centers 520, 540, and 580. Based on determining the message segments were received from a remote data center, the data center 560 moves the received missing message segments directly to the global storage 575. In either case, after receiving the missing message segments, the concatenator 565 determines that all message segments of the four-part message have been received. The concatenator 565 then concatenates message segments 1 to 4 of the MMS message into a concatenated MMS message. And the data center 560 sends the concatenated MMS message to the SMS provider 515. In turn, the message provider sends the concatenated MMS message across communication network 503 to the client device 510.

Figure 6:
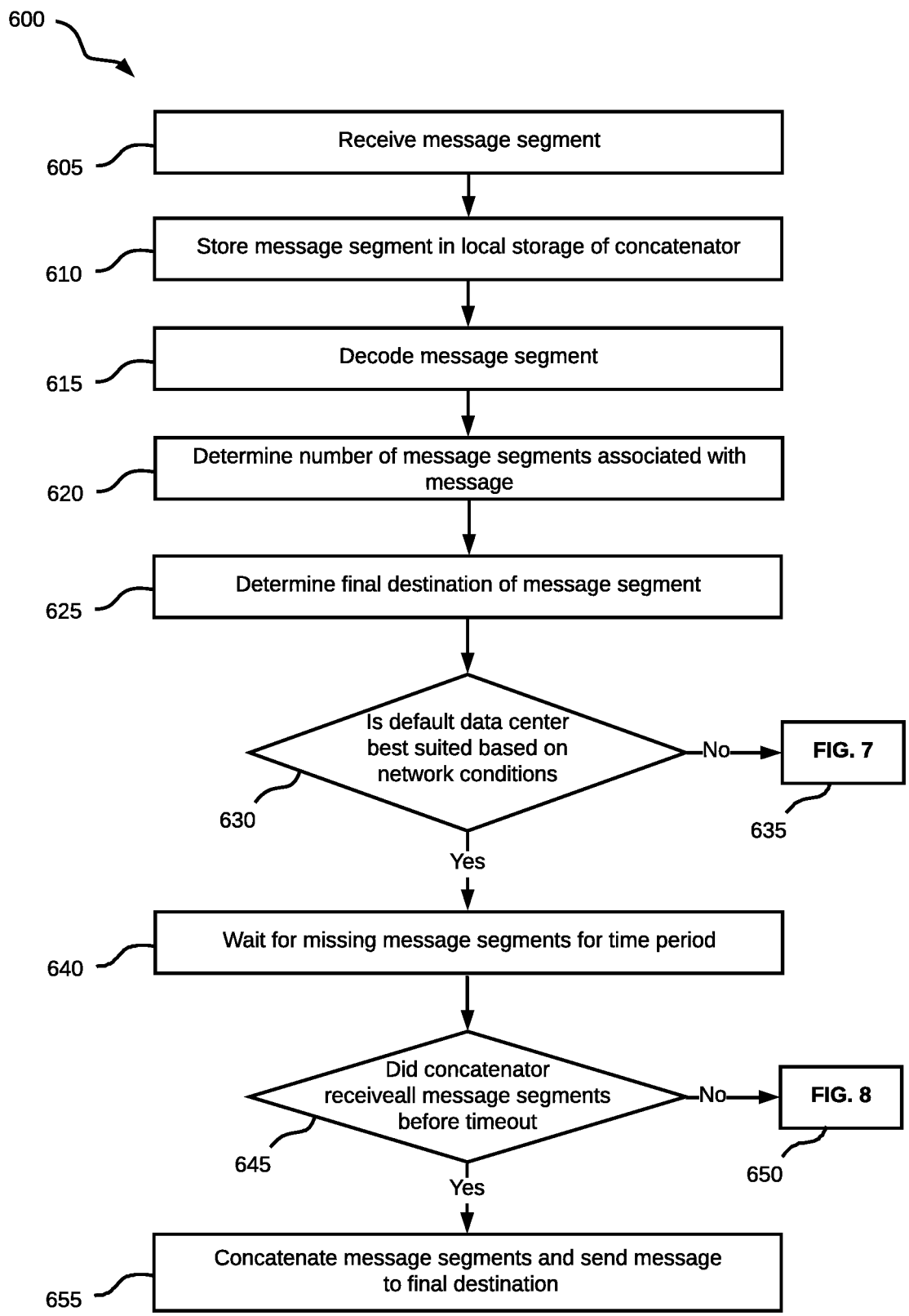
FIG. 6 shows an example method for providing segmented messaging in a communications network according to this disclosure.

FIG. 6 shows an example method 600 for providing for segmented messaging in a communications network (e.g., wireless network 401). In some examples, the steps shown in FIG. 6 may be implemented in program code that is executable by a processor, for example, the processor 440 or a processor in a general-purpose computer or server. In some embodiments, one or more steps shown in FIG. 6 may be omitted or performed in a different order. Similarly, additional steps not shown in FIG. 6 may also be performed. For illustrative purposes, the steps of the method 600 are described below with reference to components described above with regard to the system 400 shown in FIG. 4, but any suitable system according to this disclosure may be employed.

The method 600 begins at block 605, when the data center 420 receives a part of a message (e.g., a message segment of a message) from client device 405. The client device 405 may communicate with the data center 420 via one or more wired or wireless connections. For example, the client device 405 may send the message segment across one or more networks 401 according to any of the techniques discussed herein, e.g., via an SMS provider (e.g., SMS providers 115, 215, 315, 415), a second SMS provider (e.g., second SMS providers 350, 450), another message provider (e.g., SMS provider 515), one or more CPEs (e.g., CPEs 455-*a*, 455-*b*, 455-*c*, 495-*a*, 495-*b*, 495-*c*), or a combination of these. In one example, the data center 420 receives the message segment of the message from the client device 405 via SMS provider 415, and the message segment of the message may also include additional information. In some examples, the additional information may include contextual information, profile information, user information, authentication information, billing information, a network address, encryption information, transcoding information, segmentation information, destination information, security information, a timestamp, or any combination of these.

At block 610, the data center 420 stores the part of the message from the client device 405 in a local storage 430 of concatenator 425. The local storage 430 may be a separate unit or device from the concatenator 425. In some examples, the local storage 430 may include a discrete section or portion of the concatenator 425. However, in this example, the concatenator 425 stores the message segment of the message in a particular portion or location of the local storage 430 based on a hashing function.

At block 615, the processor 440 decodes the part of the message to obtain information about the message, such as segmentation information that indicates a number of message segments associated with the message. In some examples, the processor 440 may obtain additional information such as contextual information. In one example, this contextual information may be used by the processor 440 to determine a characteristic (e.g., an access level or prioritization) of a user or client device 405 associated with the message. For instance, the processor 440 may determine profile information, user information, authentication information, billing information, a network address, encryption information, transcoding information, destination information, security information, a timestamp, or a combination of these based on the contextual information.

At block 620, the processor 440 determines a number of message segments associated with the message. For example, the processor 440 may determine that a message includes a number of message segments based on the segmentation information associated with the decoded message. The segmentation information may indicate a number of message segments included in the message, the order of the message segments, as well as an identifier of which message segment the message is within the order of the message segments.

At block 625, the processor 440 determines a final destination of the message (e.g., client device 410). For example, the processor 440 may determine that a location associated with an intended recipient of the message based on the additional information associated with the decoded message. In some examples, the additional information may be final destination information. And in some examples, the final destination information may indicate an IP address, MAC address, or other location information associated with the final destination of intended recipient of the message.

Block 630 is a decision block, where the processor 440 determines whether the data center 420 is the best choice to handle the message based on network conditions. The processor 440 utilizes information obtained at block 625 to determine whether the data center 420 is the best network location for routing the message to the final destination. For example, the processor 440 monitors one or more network conditions (e.g., an amount of network traffic). In some examples, the processor 440 may monitor or derive one or more network conditions based on an amount of network congestion, an amount of packet loss between network devices, an error rate associated with one or more data transmissions, one or more network outages or failure notifications, a shortest path (e.g., in time or physical distance), a specified hop limit, network degradation, an amount of data associated with the message, a signal strength associated with a last known location of a client device, a historical amount of throughput data associated with a particular location, etc.

But in this example, at block 630, the processor 440 determines that the data center 420 is the best network location based on network conditions obtained from block 625. In some examples, the processor 440 may determine that the data center 420 is the best network location based on any of the data discussed above. And the processor 440 may also use any combination on a hop count, current network speeds, network latency, load balancing, a hop limit, routing table, hash function, or IP addresses to make such a determination.

Alternatively, at block 630, the processor 440 may utilize information obtained at block 625 to determine that the data center 420 is not the best choice to handle the message based on network conditions. In this case, the processor 440 makes the determination based on the network data as discussed above and proceeds to block 635. Block 635 is discussed in greater detail with respect to FIG. 7 below.

At block 640, the method 600 continues based on the determination made at block 630 that the concatenator 425 is the closest network location, in which case the processor 440 waits for missing message segments of the message for a time period. In some examples, the processor 440 may wait for a predetermined time period. And in some examples, the processor 440 may request retransmission of the missing message segments if the duration of time expires.

Block 645 is a second decision block, where the processor 440 determines whether the concatenator 425 received all of the message segments during the time period. The processor 440 utilizes information obtained at block 625 to determine whether the concatenator 425 received all of the message segments. For example, the processor 440 may compare data received during the time period to segmentation information associated with the missing message segments. In another example, the processor 440 may query the concatenator 425 for missing message segments based on segmentation information or a message identifier.

Alternatively, at block 650, the processor 440 may utilize information obtained at block 625 to determine that the concatenator 425 did not receive all of the message segments during the time period. Similarly, the processor 440 may make such a determination by comparing data received during the time period to segmentation information, by querying the concatenator 425 for missing message segments using a message identifier, or by any other suitable technique discussed herein. In this case, the processor 440 makes the determination based on the absence of the missing message segments and proceeds to block 650. Block 650 continues with FIG. 8, which occurs after determining the absence of missing message segments after the time period at block 640 elapses.

At block 655, having determined that the concatenator 425 did receive all message segments associated with the message during the time period, the concatenator 425 concatenates all of the message segments associated with the message and sends the concatenated message to the final destination, client device 410.

Figure 7:
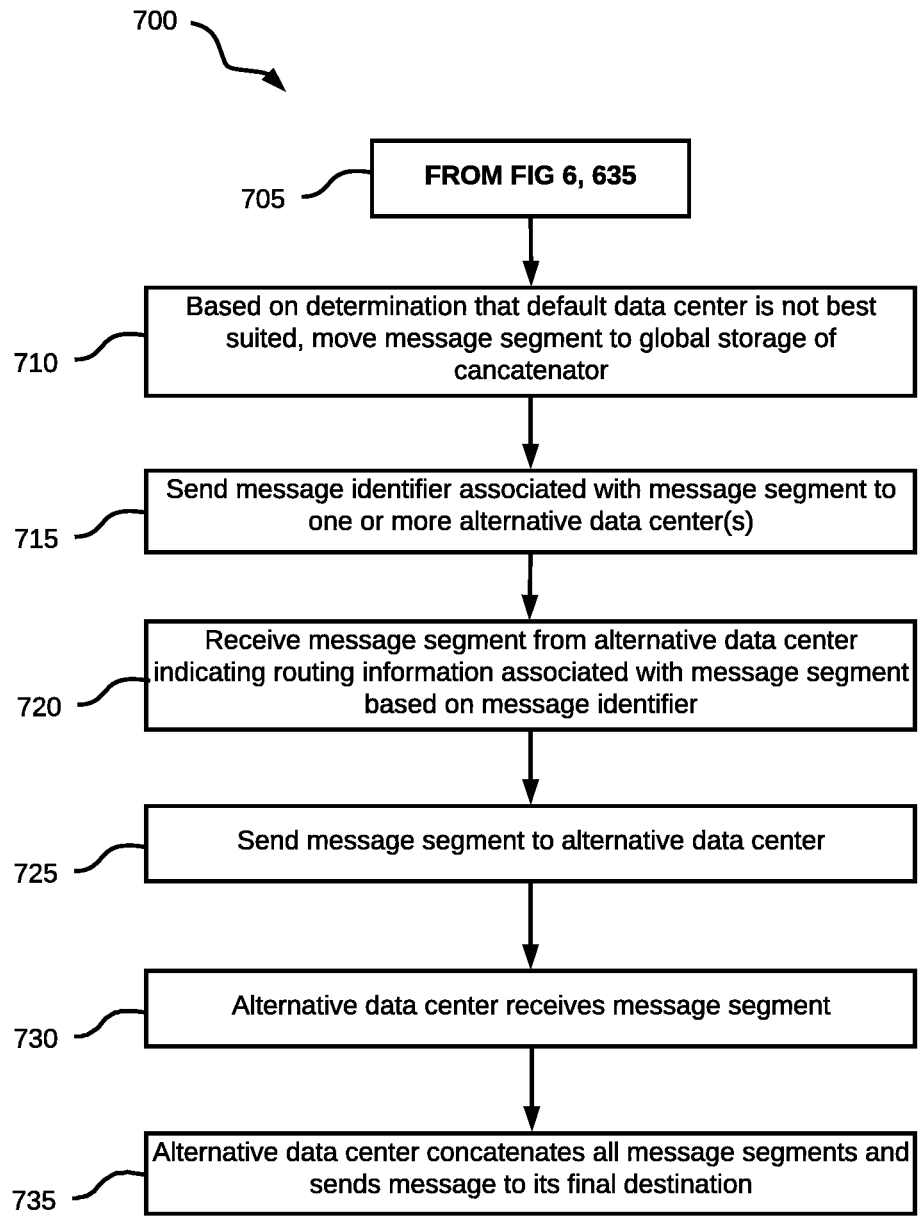
FIG. 7 shows another example method for providing segmented messaging in a communications network according to this disclosure.

FIG. 7 shows an example method 700 shows another example method for providing segmented messaging in a communications network (e.g., network 401). In some examples, the steps shown in FIG. 7 may be implemented in program code that is executable by a processor, for example, the processor 440 in the data center 420 or a processor in a general-purpose computer or server. In some embodiments, one or more steps shown in FIG. 7 may be omitted or performed in a different order. Similarly, additional steps not shown in FIG. 7 may also be performed. For illustrative purposes, the steps of the method 700 are described below with reference to components described above with regard to the data center 420 shown in FIG. 4, but any suitable system according to this disclosure may be employed.

The example method 700 begins as a continuation from the determination made in block 635 shown in FIG. 6, starting at block 705, when the processor 440 of the data center 420 determines that the data center 420 is not the best choice to handle the message based on network conditions.

At block 710, the data center 420 stores the part of the message from the client device 405 in a global storage 435 of concatenator 425. The concatenator 425 may move the received message segment from a local storage 430 to the global storage 435. As discussed above, the concatenator 425 may move the message segment to the global storage 435 to facilitate faster and/or more efficient processing of message segments stored locally. And in some examples, a concatenator (e.g., concatenator 565 discussed above) may concatenate missing message segments, upon reception, with less processing required based on a movement of message segments to a global storage.

At block 720, the data center 420 sends a message identifier associated with the message to one or more remote computing devices (e.g., data centers 260, 360, 460). The message identifier may indicate a number and order associated with a particular message segment with respect to the message segments in the message. In some examples, the data center 420 may encode the message identifier to include additional information such as a storage location associated with the message segments. And in one example, the storage location included in the message includes a hash value associated with a particular global storage location of the data center 420. And in some examples, the message identifier may include one or more IP addresses, routing information, a particular protocol, or a geographic location associated with a routing path or final destination of the message.

In some examples, the data center 420 may include a message identifier in a packet header of the message segments. The message identifier may include segmentation information (e.g., a location of a next hop and/or a location of the final destination) associated with each of the message segments. Further, the message identifier may include information associated with a particular bind (e.g., gateway, router, geographic region, final destination, originating or destination client devices, etc.). And in some examples, the message identifier may include network constraints or assignments that bind a particular client device to a particular routing pathway or network device. In some examples, the message identifier may be assigned based on network constraints such as a maximum hop count, a minimum or maximum threshold network speed, a threshold amount of time delay associated with network latency, another network constraint described herein, or any combination of these.

At block 725, the data center 420 receives a message from a remote computing device (e.g., data center 460), the message indicating routing information that is associated with the part of the message based on the message identifier. For example, the data center 420 may receive a request from data center 460. In one example, the request may be for segmentation information associated with the message. For instance, the data center 460 may request information indicating a number of, order of, or both a number and order of the message segments the data center 420 has received. In some examples, the data center 460 may request transmission of the message segment or message segments associated with the message from the data center 420.

At block 730, data center 420 sends the part of the message to the remote computing device (e.g., data center 460). And upon receipt of the request, the data center 420 may send the missing message segment or missing message segments to the requesting data center 460. In some examples, the data center 460 may also wait for a predetermined time period for the missing message segments from data center 420. If the data center 460 does not receive the missing message segments before the time period expires, the data center 460 may resend the request for the missing message segments to the data center 420. Alternatively, the data center may send one or more requests to one or more remote computing devices for the missing message segments. For example, the data center 460 may send a request to the SMS provider 415 or client device 405 for the missing message segments according to any of the techniques discussed herein.

At block 735, the data center 460 receives the missing message segment or missing message segments from the data center 420. The data center 460 may receive the missing message segment or missing message segments according to any of the techniques discussed herein.

At block 740, after receiving all of the message segments of the message at block 735, the concatenator 465 concatenates all the message segments of the message and sends the concatenated message to the final destination, client device 410.

Figure 8:
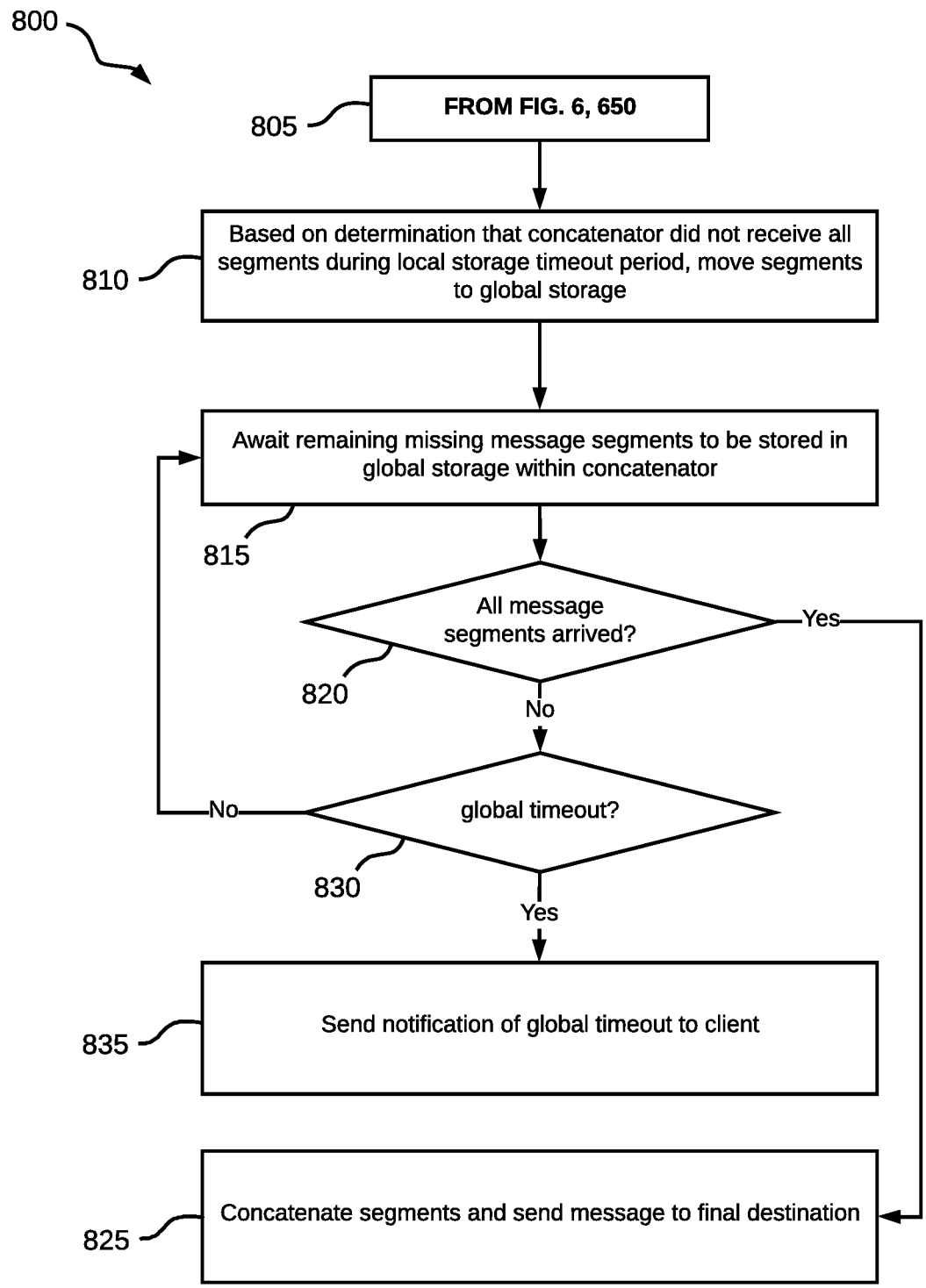
FIG. 8 shows another example method for providing segmented messaging in a communications network according to this disclosure.

FIG. 8 shows another example method 800 for providing segmented messaging in a communications network (e.g., network 401). In some examples, the steps shown in FIG. 8 may be implemented in program code that is executable by a processor, for example, the processor 440 in the data center 420 or a processor in a general-purpose computer or server. In some embodiments, one or more steps shown in FIG. 8 may be omitted or performed in a different order. Similarly, additional steps not shown in FIG. 8 may also be performed. For illustrative purposes, the steps of the method 800 are described below with reference to components described above with regard to the data center 420 shown in FIG. 4, but any suitable system according to this disclosure may be employed.

The example method 800 begins as a continuation from the determination made in block 645 shown in FIG. 6, starting at block 805, when the processor 440 of the data center 420 determines that the concatenator 425 did not receive all of the message segments during the local storage timeout period.

At block 810, the data center 420 moves the locally stored message segments to a global storage 435 of concatenator 425 based on the determination made at block 645. The concatenator 425 moves the received message segments from a local storage 430 to the global storage 435.

Once the existing message segments have been relocated to global storage 435, concatenator 425 awaits the arrival of any remaining message segments at block 815. Should any message segments arrive they will also be stored in global storage 435. At decision block 820, it is determined if all of the message segments have arrived. If so, concatenator 425 concatenates the message segments in global storage 435 and sends them to the next hop on the way to their final destination at block 825. The next hop may be to an SMS provider.

If all of the message segments have not yet arrived it is determined at decision block 830 whether the global timeout period has expired. If not, control is returned to block 815 where the concatenator awaits the arrival of additional message segments. If the global timeout parameter has expired a notification of the timeout may be sent at block 835 to the client. The client upon learning of the timeout may choose to resend the entire message.

Although the above operations are described sequentially, many of the operations can be performed in parallel or concurrently. In addition, the order of the operations may be rearranged. A process may have additional steps not included in the FIGS. 6-8. Furthermore, examples of the methods may be implemented by hardware, software, firmware, middleware, microcode, hardware description languages, or any combination thereof. When implemented in software, firmware, middleware, or microcode, the program code or code message segments to perform the necessary tasks may be stored in a non-transitory computer-readable medium such as a storage medium. Processors may perform the described tasks.

Figure 9:
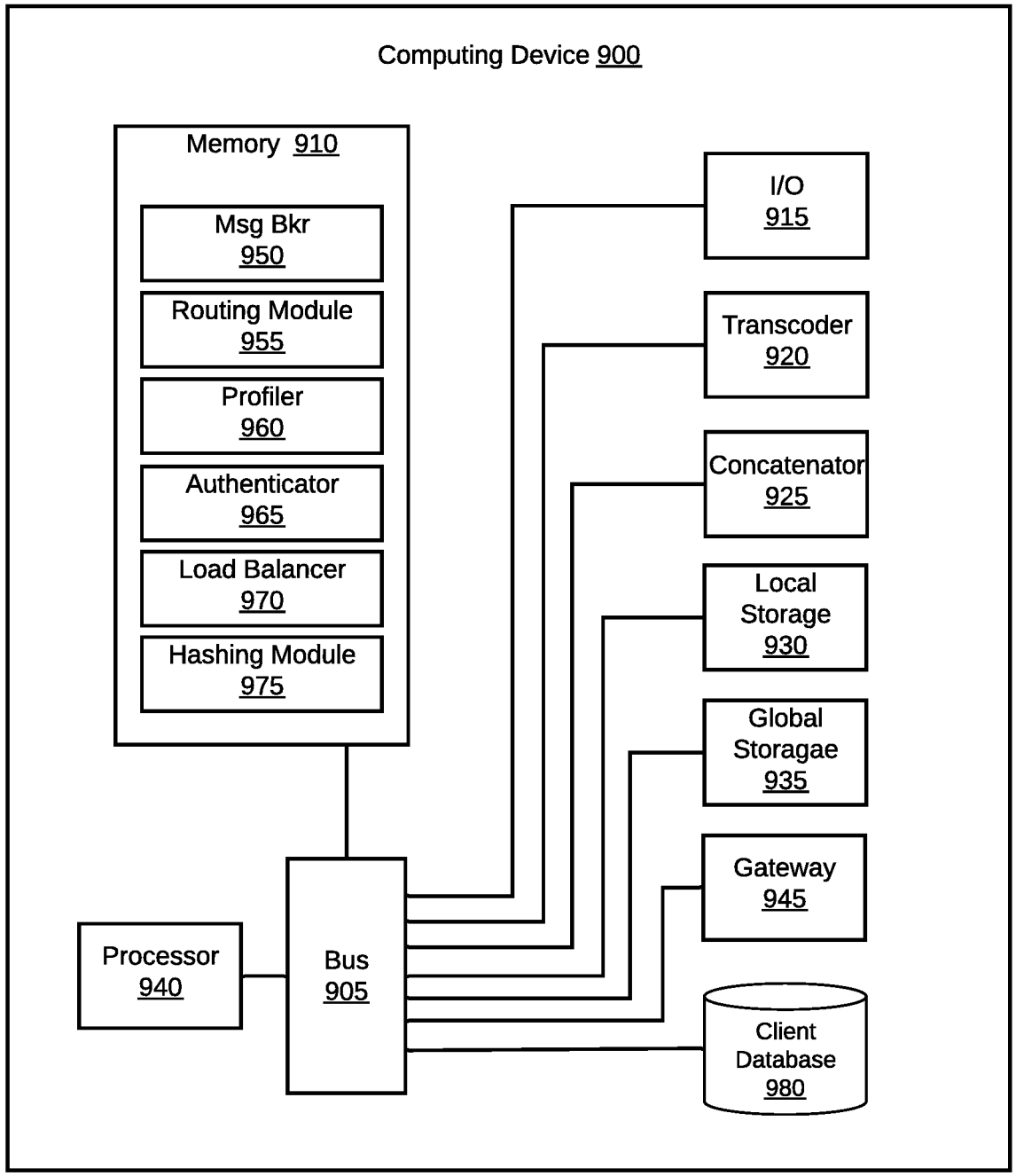
FIG. 9 shows an example computing device suitable for use with example systems for segmented messaging in a communications network according to this disclosure.

FIG. 9 shows an example of a computing device 900 suitable for use with any of the examples described above. The example computing device 900 may be, for example, any of data centers 120, 220, 260, 320, 360, 420, 460, 520, 540, 560, 580, a computer, or any other type of suitable computing device. In some examples, the computing device 900 can be any suitable computing device for receiving and sending messages according to the techniques described herein.

The computing device 900 includes a processor 440 communicatively coupled to other hardware via a bus 905. The processor 940 can include one or more commercially available processors, embedded processors, secure processors, microprocessors, dual microprocessors, multi-core processors, other multi-processor architectures, another suitable processing device, or any combination of these. A memory 910, which can be any suitable tangible (and non-transitory) computer-readable medium such as random access memory (RAM), read-only memory (ROM), erasable and electronically programmable read-only memory (EE-PROMs), or the like, embodies program components that configure operation of the computing device 900. In the embodiment shown, computing device 900 further includes a concatenator 925, local storage 930, global storage 935, and gateway 945, each of which may include any or all of their respective features discussed herein. The computing device 900 also includes one or more input/output (I/O) interface components 915, a transcoder 920, and a client database 980.

Gateway 945 can include one or more network interface devices or any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, LTE, 5G, or other mobile communications network).

I/O components 915 may be used to facilitate wired or wireless connections to devices such as one or more displays, game controllers, keyboards, mice, joysticks, cameras, buttons, speakers, microphones and/or other hardware used to input or output data. Local storage 930 and global storage 935 represent nonvolatile storages such as magnetic, optical, or other storage media included in computing device 900 or coupled to processor 940.

In some embodiments, the computing device 900 includes a transcoder 920. The transcoder 920 may decode or encode messages according to any of the techniques discussed herein. For example, the transcoder 920 may decode content associated with a message or a message segment of a message. In some examples the transcoder 920 may decode the message or message segment to obtain segmentation information, a number of message segments associated with the message, an origination location or a final destination associated with the message, or any other encoded information discussed herein. And in some examples, the transcoder 920 may encode information associated with a message or a message segment based on codecs described herein. For example, the transcoder 920 may encode a short message according to one or more protocols for transmission (e.g., SMPP).

In some embodiments, the computing device 900 includes a client database 980. The client database 980 may include information related to authorized users or particular client devices associated with the computing device 900. For example, the client database 980 may include profile information such as user information (e.g., a user's name, contact information, a mailing address, a telephone number, personal information, usage data, etc.), authentication information (e.g., a username, a password, a PIN, etc.), billing information (e.g., a billing rate, a billing address, account information, a level of service associated with an account, etc.), a network address (e.g., a most recent IP address, a home IP address, a work IP address, etc.).

In some examples, the processor 940 may execute program code or instructions stored in memory 910 (e.g., a message broker 950, routing module 955, load balancer 970, and/or hashing module 975). The profiler 960 may collect information pertaining to a particular user or client device (e.g., client device 105). In some examples, the profiler 960 may build or format a user profile. Further, the profiler 960 may send and receive information from the client database 980. In some examples, the profiler 960 may provide updates to the client database 980 based on information collected pertaining to the particular user or client device.

In some examples, the processor 940 may execute program code or instructions for an authenticator 965 stored in memory 910. The processor 440 may execute the authenticator 965 to determine whether a particular user or client device is authorized to access information within a network (e.g., network 401). In some examples, the authenticator 965 may include instructions that allow or disallow a user or client device to send or receive messages. In one example, the authenticator 965 may cause the processor 940 to access one or more lookup tables stored in memory 910 to determine whether a user or client device is authorized to access the network 401. In some examples, the authenticator 965 may compare the user or client device associated with a particular request to a whitelist or a blacklist to determine whether the user or client device is authorized. In another example, the authenticator 965 may compare the user or client device associated with a particular request to billing information to determine an access level of the user or client device.

It should be appreciated that computing device 900 may also include additional processors, additional storage, and a computer-readable medium (not shown). The processor(s) 940 may execute additional computer-executable program instructions stored in memory 910. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

GENERAL CONSIDERATIONS

Certain aspects and features of the present disclosure involve systems capable of providing segmented messaging in a communications network with which a user may send or receive message. The methods, devices, and systems discussed above are examples. Various configurations may omit, substitute, or add various procedures or components. For example, in alternative configurations, the methods may be performed in a different order. In another example, the methods may be performed with fewer steps, more steps, or in combination. In addition, certain configurations may be combined in various configurations. As technology evolves, many of the elements are examples and do not limit the scope of the disclosure or claims.

While some examples of methods, devices, and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. A method of passing short message service (SMS) messages between sending and receiving SMS service providers over a network comprising a default data center and one or more alternative data centers, comprising:

in the default data center:
receiving at least one message segment of a multi-segment SMS message from the sending SMS provider into a concatenator comprising a local and a global storage area and storing the at least one message segment in the local storage area of the concatenator, the at least one message segment of the multi-segment message comprising segmentation information indicative of a number of message segments associated with the SMS message, routing information associated with the message segment, the sending SMS provider, and the receiving SMS provider;

determining whether all of the message segments have been received, wherein:
    based on a determination that all of the message segments have been received within a local timeout period:
        concatenating the message segments into a single SMS message; and
        sending the concatenated SMS message to the receiving SMS service provider; and
    based on a determination that not all of the message segments have been received:
        sending the received message segments to one of the alternative data centers;
in the alternative data center:
    receiving all of the message segments from one or more data centers;
    concatenating all of the message segments into a single SMS message; and
    sending the concatenated SMS message to the receiving SMS service provider.

2. The method of claim 1, further comprising, in the default data center:
    determining whether the default data center is the data center best suited to handle the message segments based on network conditions.

3. The method of claim 2, further comprising, based on a determination that the default data center is not the data center best suited to handle the message segments, in the default data center:
    moving the received message segments to the global storage area of the concatenator;
    sending the message segments to an alternative data center.

4. The method of claim 3, further comprising, in the alternative data center:
    receiving message segments and storing the message segments in a global storage area of a concatenator;
    concatenating all the message segments into a single SMS message once all the message segments have been received within a global timeout period; and
    sending the concatenated SMS message to the receiving SMS provider based on the routing information.

5. The method of claim 4, further comprising, in the alternative data center:
    sending a fail notification to the sending SMS provider when not all of the message segments have been received within the global time out period.

6. The method of claim 2, further comprising, based on a determination that the default data center is not the data center best suited to handle the message segments and based on a determination that all of the message segments have not been received prior to the local timeout period, in the default data center:
    moving the received message segments from the local storage area to the global storage area of the concatenator;
    awaiting and storing in the global storage area any remaining message segments received from other data centers; and
    concatenating all the message segments into a single SMS message once all the message segments have been received within the global timeout period; and
    sending the concatenated SMS message to the receiving SMS provider based on the routing information.

7. The method of claim 6, further comprising, in the default data center:
    sending a fail notification to the sending SMS provider when not all of the message segments have been received within the global time out period.

8. A messaging system comprising:
a default of data center and one or more alternative data centers collectively configured to pass short message service (SMS) messages between sending and receiving SMS service providers, each data center comprising a non-transitory computer-readable medium and one or more processors in communication with the non-transitory computer-readable medium, the one or more processors configured to execute instructions stored in the non-transitory computer-readable medium to:
    in the default data center:
        receive at least one message segment of a multi-segment SMS message from the sending SMS provider into a concatenator comprising a local and a global storage area and storing the at least one message segment in the local storage area of the concatenator, the at least one message segment of the multi-segment message comprising segmentation information indicative of a number of message segments associated with the SMS message, routing information associated with the message segment, the sending SMS provider, and the receiving SMS provider;
        determine whether all of the message segments have been received, wherein:
            based on a determination that all of the message segments have been received within a local timeout period:
                concatenate the message segments into a single SMS message; and
                send the concatenated SMS message to the receiving SMS service provider; and
            based on a determination that not all of the message segments have been received:
                send the received message segments to one of the alternative data centers;
    in the alternative data center:
        receive all of the message segments from one or more data centers;
        concatenate all of the message segments into a single SMS message; and
        send the concatenated SMS message to the receiving SMS service provider.

9. The messaging system of claim 8, wherein the default data center determines whether it is the data center best suited to handle the message segments based on network conditions.

10. The messaging system of claim 9, wherein based on a determination that the default data center is not the data center best suited to handle the message segments, the default data center:
    moves the received message segments to the global storage area of the concatenator;
    sends the message segments to an alternative data center.

11. The messaging system of claim 10, wherein the alternative data center:
    receives message segments and stores the message segments in a global storage area of a concatenator;
    concatenates all the message segments into a single SMS message once all the message segments have been received within a global timeout period; and
    sends the concatenated SMS message to the receiving SMS provider based on the routing information.

12. The messaging system of claim 11, wherein the alternative data center:
  sends a fail notification to the sending SMS provider when not all of the message segments have been received within the global time out period.

13. The messaging system of claim 9, wherein based on a determination that the default data center is the data center best suited to handle the message segments and based on a determination that all of the message segments have not been received prior to the local timeout period, the default data center:
  moves the received message segments from the local storage area to the global storage area of the concatenator;
  awaits and stores in the global storage area any remaining message segments received from other data centers; and
  concatenates all the message segments into a single SMS message once all the message segments have been received within the global timeout period; and
  sends the concatenated SMS message to the receiving SMS provider based on the routing information.

14. The messaging system of claim 13, wherein the default data center:
  sends a fail notification to the sending SMS provider when not all of the message segments have been received within the global time out period.

15. At least one non-transitory machine-readable medium comprising a set of instructions executable on at least one computing device to cause the at least one computing device to pass short message service (SMS) messages between sending and receiving SMS service providers, the at least one computing device configured to execute instructions stored in the non-transitory machine-readable medium to:
  in a default data center:
    receive at least one message segment of a multi-segment SMS message from the sending SMS provider into a concatenator comprising a local and a global storage area and storing the at least one message segment in the local storage area of the concatenator, the at least one message segment of the multi-segment message comprising segmentation information indicative of a number of message segments associated with the SMS message, routing information associated with the message segment, the sending SMS provider, and the receiving SMS provider;
    determine whether all of the message segments have been received, wherein:
      based on a determination that all of the message segments have been received within a local timeout period:
        concatenate the message segments into a single SMS message; and
        send the concatenated SMS message to the receiving SMS service provider; and
      based on a determination that not all of the message segments have been received:
        send the received message segments to one of an alternative data center;
  in an alternative data center:
    receive all of the message segments from one or more data centers;
    concatenate all of the message segments into a single SMS message; and
    send the concatenated SMS message to the receiving SMS service provider.

16. The at least one non-transitory machine-readable medium of claim 15, the set of instructions executable on at least one computing device further configured to execute instructions stored in the non-transitory machine-readable medium to:
  determine whether the default data center best suited to handle the message segments based on network conditions.

17. The at least one non-transitory machine-readable medium of claim 16, the set of instructions executable on at least one computing device further configured to execute instructions stored in the non-transitory machine-readable medium to:
  based on a determination that the default data center is not the data center best suited to handle the message segments:
    move the received message segments to the global storage area of the concatenator;
    send the message segments to an alternative data center.

18. The at least one non-transitory machine-readable medium of claim 17, the set of instructions executable on at least one computing device further configured to execute instructions stored in the non-transitory machine-readable medium to:
  in the alternative data center:
    receive message segments and stores the message segments in a global storage area of a concatenator;
    concatenate all the message segments into a single SMS message once all the message segments have been received within a global timeout period; and
    send the concatenated SMS message to the receiving SMS provider based on the routing information.

19. The at least one non-transitory machine-readable medium of claim 18, the set of instructions executable on at least one computing device further configured to execute instructions stored in the non-transitory machine-readable medium to:
  in the alternative data center:
    send a fail notification to the sending SMS provider when not all of the message segments have been received within the global time out period.

20. The at least one non-transitory machine-readable medium of claim 16, the set of instructions executable on at least one computing device further configured to execute instructions stored in the non-transitory machine-readable medium to:
  in the default data center and based on a determination that the default data center is the data center best suited to handle the message segments and based on a determination that all of the message segments have not been received prior to the local timeout period:
    move the received message segments from the local storage area to the global storage area of the concatenator;
    await and store in the global storage area any remaining message segments received from other data centers; and
    concatenate all the message segments into a single SMS message once all the message segments have been received within the global timeout period; and
    send the concatenated SMS message to the receiving SMS provider based on the routing information.

21. The at least one non-transitory machine-readable medium of claim 20, the set of instructions executable on at least one computing device further configured to execute instructions stored in the non-transitory machine-readable medium to:
  in the default data center:
    send a fail notification to the sending SMS provider when not all of the message segments have been received within the global time out period.

\* \* \* \* \*